（12）United States Patent
Cupala et al.

(10) Patent No.: US 9,798,457 B2
(45) Date of Patent: Oct. 24, 2017

(54) SYNCHRONIZATION OF MEDIA INTERACTIONS USING CONTEXT

(71) Applicant: Microsoft Corporation, Redmond, WA (US)

(72) Inventors: Shiraz Cupala, Seattle, WA (US); Kathleen Patricia Mulcahy, Seattle, WA (US); Howard B. Nager, Arlington, MA (US); Joshua C. Zana, Seattle, WA (US); Don F. Box, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/724,630

(22) Filed: Dec. 21, 2012

(65) Prior Publication Data

US 2013/0325954 A1     Dec. 5, 2013

Related U.S. Application Data

(60) Provisional application No. 61/654,638, filed on Jun. 1, 2012.

(51) Int. Cl.
*G06F 15/16* (2006.01)
*G06F 3/0484* (2013.01)
(Continued)

(52) U.S. Cl.
CPC .......... *G06F 3/04847* (2013.01); *A63F 13/06* (2013.01); *A63F 13/235* (2014.09);
(Continued)

(58) Field of Classification Search
CPC ............. H04L 12/1827; H04L 65/4015; H04L 65/403; H04N 7/15; H04N 21/4122;
(Continued)

(56) References Cited

U.S. PATENT DOCUMENTS

| 5,117,484 A | 5/1992 | Nakagawa et al. |
| 7,870,496 B1 | 1/2011 | Sherwani |

(Continued)

FOREIGN PATENT DOCUMENTS

| JP | 2009087026 A | 4/2009 |
| JP | 2010541398 A | 12/2010 |

(Continued)

OTHER PUBLICATIONS

"International Search Report & Written Opinion for PCT Patent Application No. PCT/US2013/042547", dated Dec. 13, 2013, Filed Date: May 24, 2013, 11 Pages.

(Continued)

*Primary Examiner* — Liangche A Wang
*Assistant Examiner* — Johnny Aguiar
(74) *Attorney, Agent, or Firm* — Shook, Hardy & Bacon L.L.P.

(57) ABSTRACT

Embodiments of the present invention provide secondary content that is synchronized to progress within a primary media content. The secondary content, may be a comment, an emote, a poll, a contextual advertisement, a special feature, or other communication synchronized to a particular point in the media. Examples of media include movies, games, television shows, sporting events, video conferences, online chat sessions, and others. Some events are synchronized using time sequencing to a particular spot within a time-based media content. The events may be published through social media outlets. The progress point associated with the event may be directly accessed by selecting a link within the event.

18 Claims, 19 Drawing Sheets

(51) Int. Cl.

| | | |
|---|---|---|
| *G06F 3/041* | (2006.01) | |
| *G06F 3/033* | (2013.01) | |
| *G06F 3/0354* | (2013.01) | |
| *G06F 3/0488* | (2013.01) | |
| *G06F 3/048* | (2013.01) | |
| *H04N 21/4722* | (2011.01) | |
| *G06F 9/44* | (2006.01) | |
| *G06F 3/01* | (2006.01) | |
| *A63F 13/20* | (2014.01) | |
| *A63F 13/235* | (2014.01) | |
| *A63F 13/493* | (2014.01) | |
| *A63F 13/812* | (2014.01) | |
| *G06K 9/00* | (2006.01) | |
| *H04N 21/41* | (2011.01) | |
| *G06F 17/30* | (2006.01) | |
| *H04N 21/845* | (2011.01) | |
| *G06F 17/24* | (2006.01) | |
| *H04L 29/06* | (2006.01) | |

(52) U.S. Cl.
CPC .......... *A63F 13/493* (2014.09); *A63F 13/812* (2014.09); *G06F 3/011* (2013.01); *G06F 3/017* (2013.01); *G06F 3/033* (2013.01); *G06F 3/03547* (2013.01); *G06F 3/041* (2013.01); *G06F 3/048* (2013.01); *G06F 3/0412* (2013.01); *G06F 3/0484* (2013.01); *G06F 3/04883* (2013.01); *G06F 9/4443* (2013.01); *G06K 9/00335* (2013.01); *H04L 65/403* (2013.01); *H04N 21/4722* (2013.01); *G06F 17/241* (2013.01); *G06F 17/30044* (2013.01); *H04L 65/4015* (2013.01); *H04N 21/4122* (2013.01); *H04N 21/8455* (2013.01)

(58) Field of Classification Search
CPC ........... H04N 21/4722; H04N 21/4788; H04N 21/8455; H04N 21/8586; G06F 3/048; G06F 17/30044; G06F 17/241
USPC ......... 386/201, 241; 705/319; 709/203, 204, 709/217, 219, 248; 715/205, 230, 719
See application file for complete search history.

(56) References Cited

U.S. PATENT DOCUMENTS

| | | | |
|---|---|---|---|
| 8,014,768 B2 | 9/2011 | Ackley | |
| 8,200,795 B2 | 6/2012 | Patil | |
| 8,521,888 B2 | 8/2013 | Larson et al. | |
| 8,595,781 B2 | 11/2013 | Neumeier et al. | |
| 8,856,355 B2 | 10/2014 | Queen | |
| 9,002,018 B2 | 4/2015 | Wilkins et al. | |
| 9,032,451 B2 | 5/2015 | Cansino et al. | |
| 9,180,374 B1 | 11/2015 | Yen | |
| 2002/0059342 A1* | 5/2002 | Gupta et al. | 707/512 |
| 2003/0025678 A1 | 2/2003 | Lee et al. | |
| 2003/0046401 A1 | 3/2003 | Abbott et al. | |
| 2003/0182663 A1 | 9/2003 | Gudorf et al. | |
| 2004/0023719 A1 | 2/2004 | Hussaini et al. | |
| 2004/0073947 A1 | 4/2004 | Gupta | |
| 2004/0120526 A1 | 6/2004 | Hamberg | |
| 2005/0081159 A1* | 4/2005 | Gupta et al. | 715/751 |
| 2005/0234958 A1* | 10/2005 | Sipusic et al. | 707/102 |
| 2007/0266304 A1* | 11/2007 | Fletcher et al. | 715/500.1 |
| 2007/0300185 A1 | 12/2007 | Macbeth et al. | |
| 2008/0248845 A1 | 10/2008 | Morgan et al. | |
| 2008/0313227 A1* | 12/2008 | Shafton et al. | 707/104.1 |
| 2009/0055739 A1 | 2/2009 | Murillo et al. | |
| 2009/0079813 A1 | 3/2009 | Hildreth | |
| 2009/0083383 A1 | 3/2009 | Piper et al. | |
| 2009/0133051 A1 | 5/2009 | Hildreth | |
| 2009/0154893 A1* | 6/2009 | Vasudevan et al. | 386/66 |
| 2009/0199098 A1 | 8/2009 | Kweon et al. | |
| 2009/0221368 A1 | 9/2009 | Yen et al. | |
| 2009/0235298 A1 | 9/2009 | Carlberg et al. | |
| 2009/0265627 A1 | 10/2009 | Kim et al. | |
| 2009/0276475 A1 | 11/2009 | Ramsey et al. | |
| 2010/0050129 A1 | 2/2010 | Li et al. | |
| 2010/0053164 A1 | 3/2010 | Imai et al. | |
| 2010/0069158 A1 | 3/2010 | Kim | |
| 2010/0162139 A1 | 6/2010 | Beebe et al. | |
| 2010/0199232 A1 | 8/2010 | Mistry et al. | |
| 2010/0235481 A1 | 9/2010 | Deutsch et al. | |
| 2010/0251167 A1 | 9/2010 | DeLuca et al. | |
| 2010/0274920 A1 | 10/2010 | Kunii et al. | |
| 2010/0277489 A1 | 11/2010 | Geisner et al. | |
| 2010/0318520 A1* | 12/2010 | Loeb et al. | 707/743 |
| 2011/0034129 A1 | 2/2011 | Kim et al. | |
| 2011/0078001 A1* | 3/2011 | Archer et al. | 705/14.2 |
| 2011/0106587 A1 | 5/2011 | Lynch et al. | |
| 2011/0111854 A1* | 5/2011 | Roberts et al. | 463/39 |
| 2011/0134030 A1 | 6/2011 | Cho | |
| 2011/0158605 A1* | 6/2011 | Bliss et al. | 386/241 |
| 2011/0173214 A1* | 7/2011 | Karim | 707/754 |
| 2011/0190055 A1 | 8/2011 | Leyvand et al. | |
| 2011/0190061 A1 | 8/2011 | Takeda et al. | |
| 2011/0202350 A1 | 8/2011 | Barnes | |
| 2011/0273625 A1 | 11/2011 | McMahon et al. | |
| 2011/0300930 A1 | 12/2011 | Hsu | |
| 2011/0302527 A1 | 12/2011 | Chen et al. | |
| 2012/0014558 A1 | 1/2012 | Stafford et al. | |
| 2012/0017147 A1 | 1/2012 | Mark | |
| 2012/0026166 A1 | 2/2012 | Takeda et al. | |
| 2012/0047289 A1 | 2/2012 | Krzystofczyk et al. | |
| 2012/0072504 A1 | 3/2012 | Kowalewski | |
| 2012/0151345 A1 | 6/2012 | Mcclements, IV | |
| 2012/0151347 A1 | 6/2012 | Mcclements, IV | |
| 2012/0162536 A1 | 6/2012 | Sibilsky et al. | |
| 2012/0174155 A1* | 7/2012 | Mowrey et al. | 725/40 |
| 2012/0207342 A1 | 8/2012 | Quail | |
| 2012/0231861 A1 | 9/2012 | Champagne et al. | |
| 2012/0302340 A1 | 11/2012 | Takemoto | |
| 2012/0331496 A1* | 12/2012 | Copertino et al. | 725/14 |
| 2013/0004138 A1* | 1/2013 | Kilar et al. | 386/230 |
| 2013/0007201 A1 | 1/2013 | Jeffrey et al. | |
| 2013/0111326 A1 | 5/2013 | Lockhart et al. | |
| 2013/0198321 A1 | 8/2013 | Martin et al. | |
| 2013/0214994 A1 | 8/2013 | Tsuda et al. | |
| 2013/0262575 A1* | 10/2013 | Xiong | H04N 21/254 709/204 |
| 2013/0321268 A1 | 12/2013 | Tuck et al. | |
| 2014/0020025 A1 | 1/2014 | Anderson et al. | |
| 2014/0195690 A1 | 7/2014 | Harrison et al. | |
| 2014/0218300 A1 | 8/2014 | Muraki et al. | |

FOREIGN PATENT DOCUMENTS

| | | |
|---|---|---|
| JP | 2011504710 A | 2/2011 |
| WO | 2009067670 A1 | 5/2009 |
| WO | 2010028690 A1 | 3/2010 |
| WO | 2011087890 A2 | 7/2011 |
| WO | 2012017525 A1 | 2/2012 |

OTHER PUBLICATIONS

Malfatti et al., Using Mobile Phones to Control Desktop Multiplayer Games, In Proceeding of 9th Brazilian Symposium on Computer Games and Digital Entertainment, Nov. 8, 2010, 7 pages.

Vajk, et al., Using a Mobile Phone as a Wii-like Controller for Playing Games on a Large Public Display, Retrieved on Oct. 12, 2012, available at http://downloads.hindawi.com/journals/ijcgt/2008/539078.pdf.

Non-Final Office Action dated Jan. 2, 2014 re U.S. Appl. No. 13/795,622, 18 pages.

Thurana, Jeffry, How to Easily Activate Two Finger Scroll in Windows Laptops, published on Mar. 23, 2010, available at http://www.makeuseof.com/tag/easily-activate-finger-scroll-windwos-laptops/.

(56) References Cited

OTHER PUBLICATIONS

Final Office Action dated Jun. 23, 2014 in U.S. Appl. No. 13/795,622, 11 pages.
International Search Report with Written Opinion dated Jun. 25, 2014 in Application No. PCT/US2014/011373, 10 pages.
Transport Layer Security, Published on: Jan. 16, 2013, Available at:http://en.wikipedia.org/w/index.php?title=Transport%20_Layer%20_Security&oldid=533283246.
Canvas element, Published on: Jan. 16, 2013, Available at:http://en.wikipedia.org/w/index.php?title=Canvas%20element&oldid=533346213.
IP forwarding algorithm, Published on: Nov. 12, 2012, Available at:http://en.wikipedia.org/w/index.php?title=IP_forwarding_algorithm&oldid=522576662.
Dmillares, ""How to Connect a Router/Switch Using the Console Port"", Published on: Oct. 16, 2010, Available at:http://www.ehow.com/how_5176394_connect-routerswitch-using-console-port.html.
Ursu, et al., "Enhancing Social Communication and Belonging by Integrating TV Narrativity and Game-Play", In Proceedings of European Interactive TV Conference, Jun. 3, 2009, 3 pages.
"Apple Shows Off Time-Shifted GameCenter Multiplayer with Real Racing 3", Published on: Sep. 12, 2012, Available at: http://techcrunch.com/2012/09/12/apple-shows-off-time-shifted-gamecenter-multiplayer-with-real-racing-3/.
Final Office Action dated Mar. 12, 2015 in U.S. Appl. No. 13/723,365, 22 pages.
Non-Final Office Action dated Oct. 8, 2014 in U.S. Appl. No. 13/723,365, 18 pages.
Non-Final Office Action dated Oct. 23, 2014 in U.S. Appl. No. 13/725,925, 21 pages.
Non-Final Office Action dated Dec. 26, 2014 in U.S. Appl. No. 13/795,622, 14 pages.
Notice of Allowance dated Jul. 1, 2015 in U.S. Appl. No. 13/725,925, 14 pages.
Non-Final Office Action dated Aug. 3, 2015 in U.S. Appl. No. 13/744,100, 31 pages.
Final Office Action dated Sep. 25, 2015 in U.S. Appl. No. 13/795,622, 13 pages.
Non-Final Office Action dated Sep. 25, 2015 in U.S. Appl. No. 13/723,365, 21 pages.
International Preliminary Report on Patentability dated Dec. 11, 2014 in Application No. PCTUS2013/042547, 8 pages.
Notice of Allowance dated Mar. 3, 2016 in U.S. Appl. No. 13/744,100, 5 pages.
Final Office Action dated Jun. 13, 2016 in U.S. Appl. No. 13/723,365, 25 pages.
Non-Final Office Action dated Sep. 30, 2016 in U.S. Appl. No. 13/723,365, 24 pages.
Notice of Allowance dated Mar. 20, 2017 in U.S. Appl. No. 13/723,365, 16 pages.
"Office Action Issued in Japanese Patent Application No. 2015-515077", dated Feb. 14, 2017, 8 Pages.

\* cited by examiner

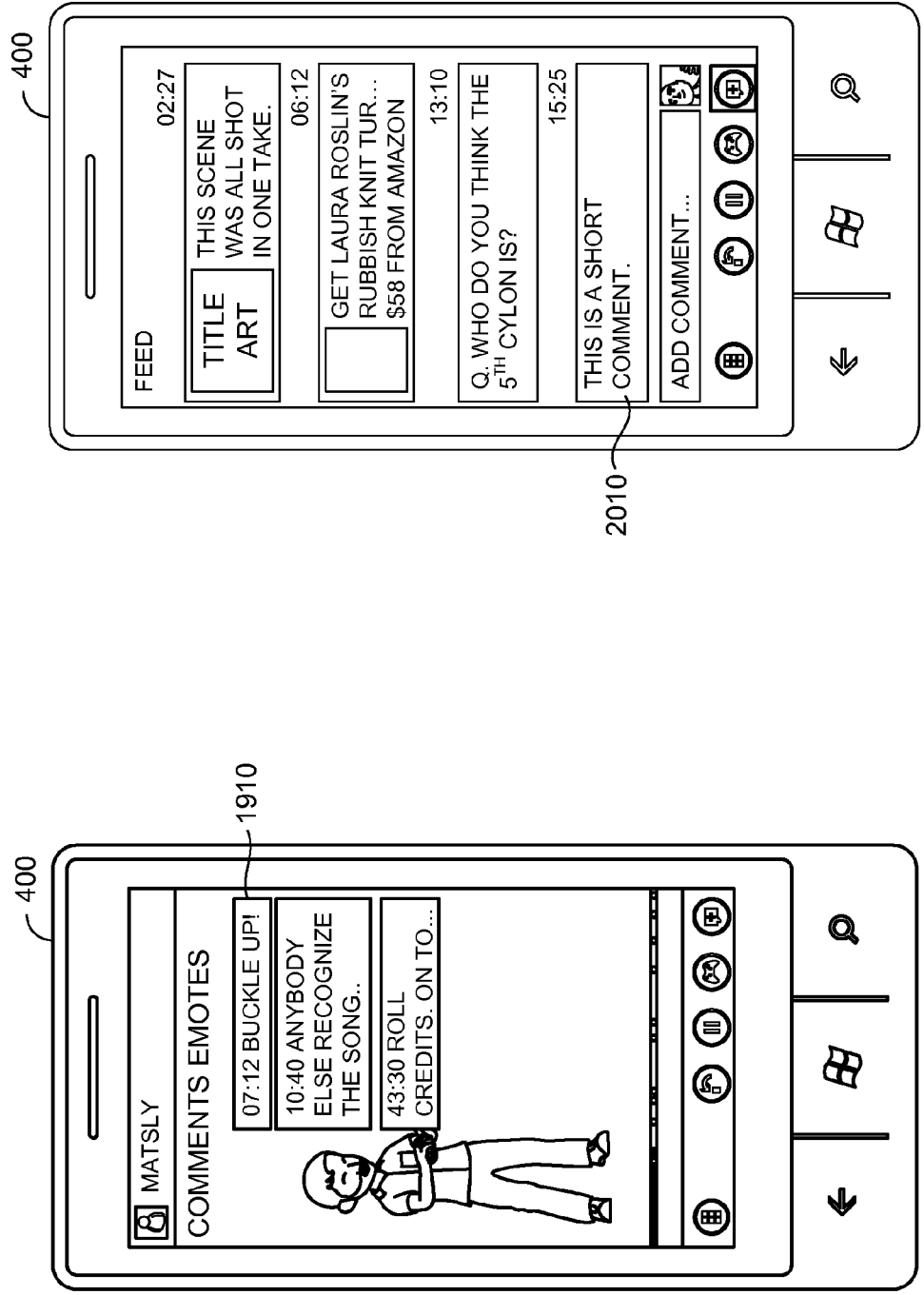

SYNCHRONIZATION OF MEDIA INTERACTIONS USING CONTEXT

CROSS-REFERENCE TO RELATED DOCUMENTS

This application claims the benefit of priority to U.S. Provisional Application No. 61/654,638, filed Jun. 1, 2012, and titled "Companion Experiences", the entirety of which is hereby incorporated by reference.

BACKGROUND

People enjoy interacting with each other while consuming media content, such as movies, television shows, and sporting events. People may enjoy media content together, even when located separately, using text messages, email, and phone calls. People may also turn to social media sites to find a community with which they may enjoy media content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide secondary content that is synchronized to progress within a primary media content. The secondary content, alternatively described as an event, may be a comment, an emote, a poll, a contextual advertisement, a special feature, or other communication synchronized to a particular point in the media. Examples of media include movies, games, television shows, sporting events, video conferences, online chat sessions, and others. Some events are synchronized using time sequencing to a particular spot within a time-based media content. For example, in a one-hour movie, an event could be time coded to 16 minutes and 33 seconds within the one-hour movie. This is in contrast, to being time coded in absolute terms, for example, Tuesday, May 22, 2012, at 7:30 p.m. However, events may also be time coded in absolute terms. For games and other non-time based media the events may be linked to a location in the media, such as a game level, game event, or virtual location.

The events may be published through social media outlets such as Twitter or Facebook. In another example, the event could be published as a text message or email. Users may have access to events published by a group of people they have selected or a service they have opened. The group of people could be those they follow on Twitter or friend on Facebook. The user could subscribe to a shopping service, or application, that shows contextual advertisements time-sequenced with media content. The events may be published or tracked by a gaming service associated with a game console or other computing device on which the media content is playing.

BRIEF DESCRIPTION OF THE DRAWINGS

Embodiments of the invention are described in detail below with reference to the attached drawing figures, wherein:

FIG. 19 is a diagram showing the emotes for a selected user, in accordance with an embodiment of the present invention;

FIG. 20 is a diagram showing the feed interface, in accordance with an embodiment of the present invention;

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide secondary content that is synchronized to progress within a primary media content. The secondary content, alternatively described as an event, may be a comment, an emote, a poll, a contextual advertisement, a special feature, or other communication synchronized to a particular point in the media. Examples of media include movies, games, television shows, sporting events, video conferences, online chat sessions, and others. Some events are synchronized using time sequencing to a particular spot within a time-based media content. For example, in a one-hour movie, an event could be time coded to 16 minutes and 33 seconds within the one-hour movie. This is in contrast, to being time coded in absolute terms, for example, Tuesday, May 22, 2012, at 7:30 p.m. However, events may also be time coded in absolute terms. For games and other non-time based media the events may be linked to a location in the media, such as a game level, game event, or virtual location.

The events may be published through social media outlets such as Twitter or Facebook. In another example, the event could be published as a text message or email. Users may have access to events published by a group of people they have selected or a service they have opened. The group of people could be those they follow on Twitter or friend on Facebook. The user could subscribe to a shopping service, or application, that shows contextual advertisements time-sequenced with media content. The events may be published or tracked by a gaming service associated with a game console or other computing device on which the media content is playing.

Having briefly described an overview of embodiments of the invention, an exemplary operating environment suitable for use in implementing embodiments of the invention is described below.

Exemplary Operating Environment

Figure 1:
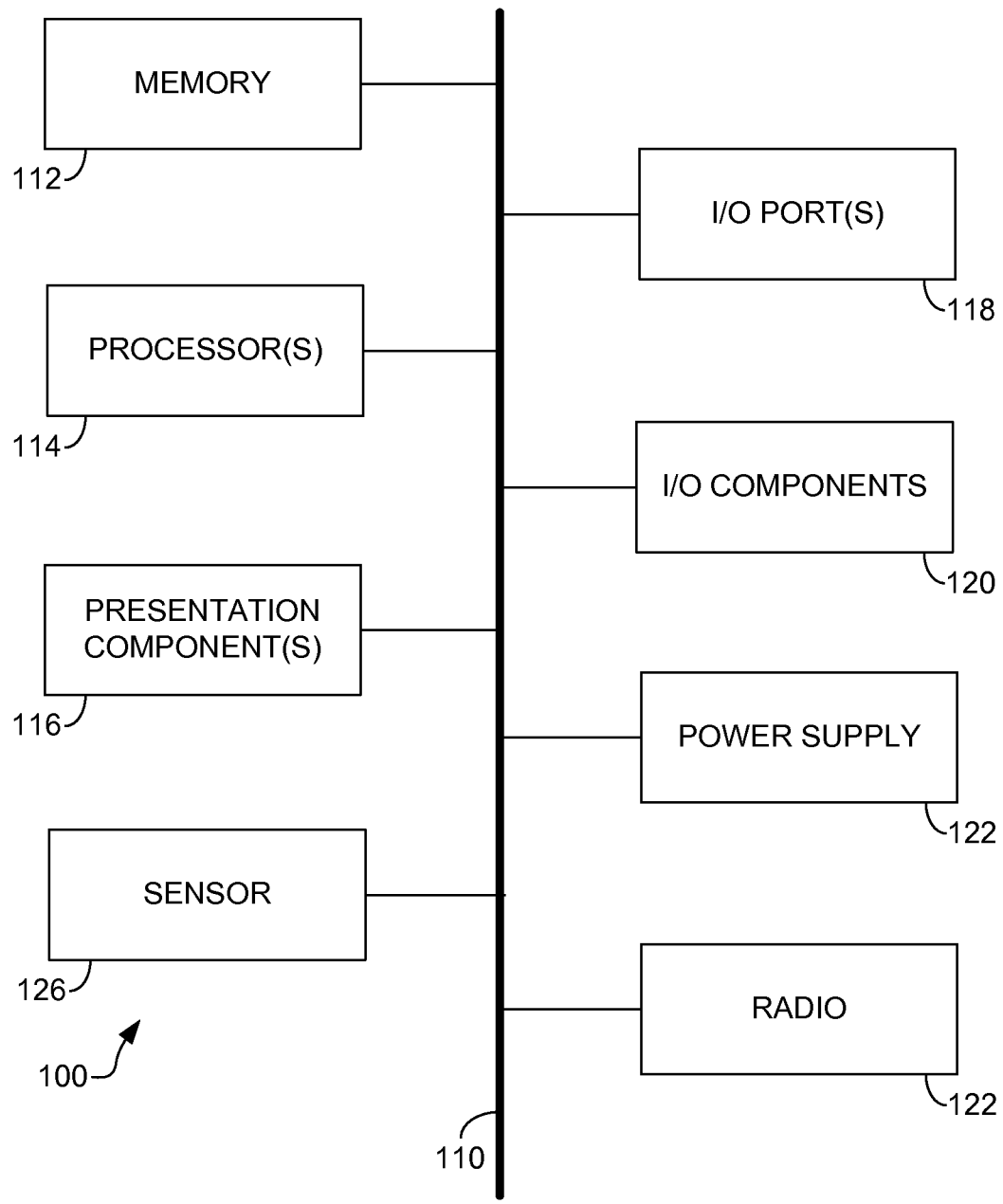
FIG. 1 is a block diagram of an exemplary computing environment suitable for implementing embodiments of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, radio 124, and sensor 126. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits are receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Figure 2:
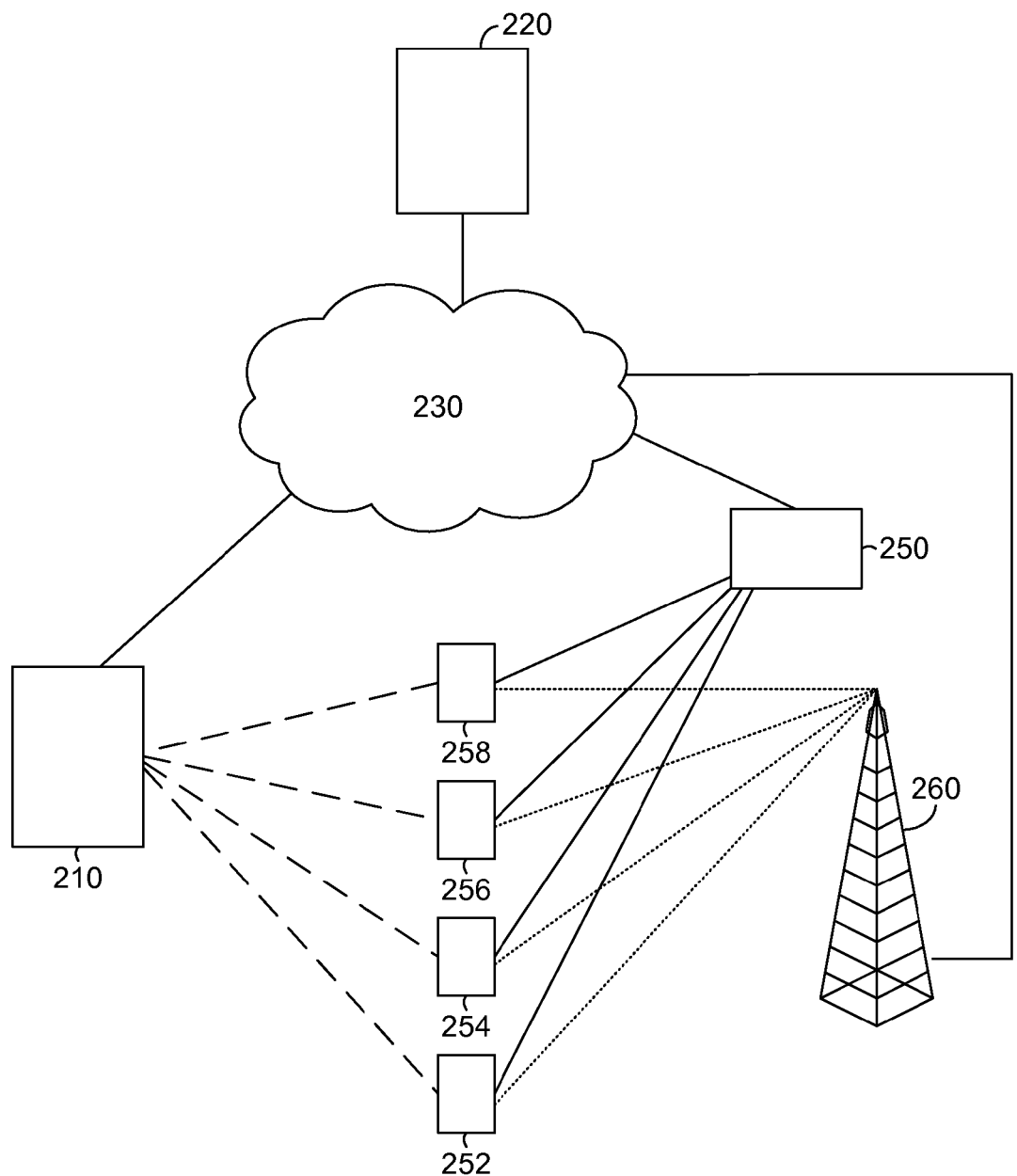
FIG. 2 is a diagram illustrating a variety of communication mediums between game consoles, game services, and companion devices, in accordance with an embodiment of the present invention.

Turning now to FIG. 2, a networked operating environment 200 comprising multiple computing devices that can provide a companion experience is shown, in accordance with embodiments of the present invention. The environment 200 includes a primary device 210, companion devices 252, 254, 256, and 258, a wireless router 250, a base station 260, a network 230 and a companion experience server 220. These devices are merely exemplary and are not intended to be limiting.

The primary device 210 may be a game console, media console, or other suitable computing device that presents titles. Titles may be games, movies, applications, music, videos, television shows, and other media content. The game console may be coupled to a display, such as a television.

The companion devices 252, 254, 256, and 258 are computing devices. A companion device, as used in this application, is a personal computing device that provides a second display. Examples include laptops, PCs, netbooks, smartphones, e-readers, PDAs, and tablets. A companion experience allows the user to interact with content related to media playing on a primary device 210 through interfaces on the companion device. The companion experience may also allow the user to control the media presentation through an interface on the companion device.

The companion experience server 220 facilitates companion experiences by providing companion content, companion applications, registering and authenticating companion devices, facilitating communications between primary devices and companion devices, and performing other tasks. The companion experience server may be accessed via a wide-area network, such as the Internet.

The companion devices 252, 254, 256, and 258 may communicate directly with the primary device 210 via Bluetooth or through a wired connection. The companion devices could also communicate over a local wireless network generated by the wireless router 250. These connections could be direct or they could be routed through the companion experience server. The companion devices could also communicate with the primary device via a data service facilitated by base station 260. The base station 260 could route communications to the primary device through whatever communication to the Internet 230 the primary device is using. The base station 260 could also be in direct communication with the primary device, if the primary device is using the same data service.

Media Linked Social Post Engine

Figure 3:
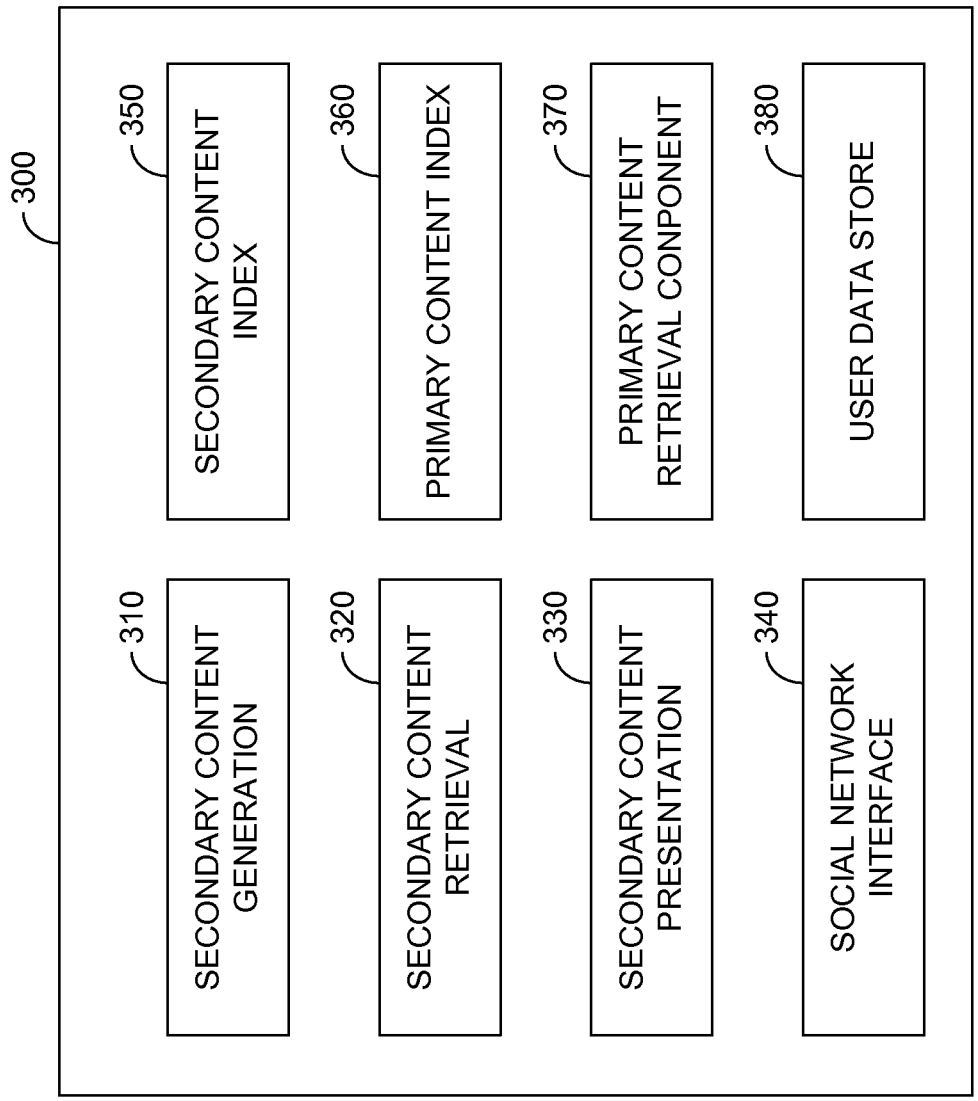
FIG. 3 is a diagram of a computing system architecture for generic messaging between a game console and a companion device, in accordance with an embodiment of the present invention.

Turning now to FIG. 3 an exemplary computing environment 300 for synchronizing primary content with secondary content is shown, in accordance with an embodiment of the present invention. Computing environment 300 includes a secondary content generation component 310, a secondary content retrieval component 320, a secondary content presentation component 330, a social network interface 340, a secondary content index 350, a primary content index 360, a primary content retrieval component 370 and a user data store 380. Together, these components allow users to create and consume secondary content that is synchronized with the primary content such as a television show.

A primary content and secondary content may be synchronized through a time stamp that indicates a progress point within the media content. Metadata maybe associated with the primary media content to allow applications to jump directly to particular progress points. Progress may be measured a number of different ways including amount of percentage of progress through a video, song, a virtual game location, a game level and other mechanisms.

The secondary content generation component 310 allows a user to generate secondary content. The secondary content generation component 310 may present a user interface through which the user is able to generate secondary content. The secondary content may comprise a social post. The social post may include text, images, emotes, and other features. Additional secondary content includes advertisements. The advertisements may be retrieved from a social network as explained in more detail subsequently. Secondary content includes an indication that a user likes a particular part of the media content may be combined with other forms of secondary content. In one embodiment, the secondary content is an emote. The emote is associated with emotion and may be expressed to others through an icon or text that communicates the emotion.

The secondary content generation component 310 may automatically associate a new piece of secondary content with the progress point of an ongoing media presentation. In one example, the media is presented on a first interface and the secondary content is generated on a second interface displayed on a companion device. Alternatively the secondary content may be displayed on the same screen as the primary content as an overlay or separate section of the screen. The user may enter text that forms a social post. The social post is automatically synchronized with the progress point in the ongoing media presentation. In one embodiment, the progress point is associated with the social post by inserting a link or code that indicates the media and the progress point. In one embodiment, users may access the media content through the social network by clicking on the link.

The secondary content retrieval component 320 retrieves content that is relevant to a current user experience. In one embodiment, content that is associated with an ongoing media presentation is deemed irrelevant to the current user experience. The secondary content retrieval component 320 may interface with social network interface 340 to identify people within the user's one or more social networks and to retrieve secondary content generated by those users.

Embodiments of the present invention are not limited to secondary content that is stored or generated in association with a social network. The secondary content retrieval component 320 may retrieve secondary content generated by directors, media companies, and others affiliated with the primary media content.

The secondary content presentation component 330 manages what secondary content should be presented at what time. In one embodiment, all of the secondary content that is available and associated with a media presentation consumed by the user is presented on an interface. In one embodiment, all of the secondary content is indicated by dots along the media progress bar. The user may access individual secondary content by hovering over selection, or otherwise interacting with the dot. In one embodiment, the secondary content may be associated with a spoiler warning which requires the user to select the secondary content a second time, perhaps after acknowledging a spoiler warning. Spoiler warnings may be added by users through the secondary content generation component 310.

Returning to the secondary content presentation component 330 exemplary presentation mechanisms are described subsequently with reference to FIGS. 4 through 28. In one embodiment described, described subsequently the secondary content is automatically displayed when the progress point associated with the secondary content matches the progress in the primary media presentation.

The social network interface 340 connects the content generation and retrieval functions of various components with available social networks. In addition, the social network interface 340 may manage metadata associated with secondary content. For example, the social network interface 340 may have access to proprietary metadata associated with secondary content and use it to associate the social post with both a primary content and a progress point within the primary content. In one embodiment, the social network interface 340 is able to add metadata to a social post that is publish through a social network. The published social post may originate with the secondary content generation component 310.

The secondary content index 350 may manage links or metadata associated with social posts and other secondary content. Each secondary content generated is associated with a primary content and a progress point within that primary content. The index may provide unique identifiers that serve as a database key to link primary content and progress within the media content.

The primary content index 360 may manage available primary content and manage progress points associated with each primary content. Additionally, the primary content index 360 may manage rights or accessibility to various forms of primary content. For example, a user may select a link on a friend's social post that would take them to a progress point within a primary content. However, the friend may not have rights to view the primary content in which case the primary content would not be displayed to the requestor. The primary content index 360 may suggest to the user how they are able to access the primary content through purchase or other mechanism.

The primary content retrieval component retrieves content in response to a request for the content. The primary content being requested by a person clicking on a link within a social post. In this case, the primary content is retrieved and opened at the point that corresponds with the progress point. In one embodiment, the progress point is not the beginning of the primary content.

The user data store 380 stores information about various users of the other components. The user data store 380 may be used to retrieve secondary content generated by a particular person. For example, a user may wish to view all the secondary content generated by a particular friend. The user data store 380 may be able to retrieve all of the relevant secondary content by author. The user data store 380 may also track user's viewing history and media consumption. This information may be used to alert the user that they have already seen a selected clip or suggest additional media for them to view. For example, if a user follows a link to the midpoint of the third episode in a television series then the viewing history may be used to generate a suggestion to start watching at the beginning of the season or the beginning of the episode if they have not seen any of the shows previously.

Content Synchronized Events

Turning now to FIGS. 4-28, events synchronized with a media content are illustrated, in accordance with embodiments of the present invention. A time synchronized event may be a comment, an emote, a poll, a contextual advertisement, a special feature, or other communication synchronized to a particular point in the media. Examples of media include movies, games, television shows, sporting events, video conferences, online chat sessions, and others. The events are time sequenced in the sense that they are time coded to a particular spot within a linear media content. For example, in a one-hour movie, an event could be time coded to 16 minutes and 33 seconds within the one-hour movie. This is in contrast, to being time coded in absolute terms, for example, Tuesday, May 22, 2012, at 7:30 p.m. However, events may also be time coded in absolute terms. For games and other non-linear media (e.g., games) the events may be linked to a location in the non-linear media, such as a game level.

The events may be published through social media outlets such as Twitter or Facebook. In another example, the event could be published as a text message or email. Users may have access to events published by a group of people they have selected or a service they have opened. The group of people could be those they follow on Twitter or friend on Facebook. The user could subscribe to a shopping service, or application, that shows contextual advertisements time-sequenced with media content. The events may be published or tracked by a gaming service associated with a game console or other computing device on which the media content is playing.

Figure 4:
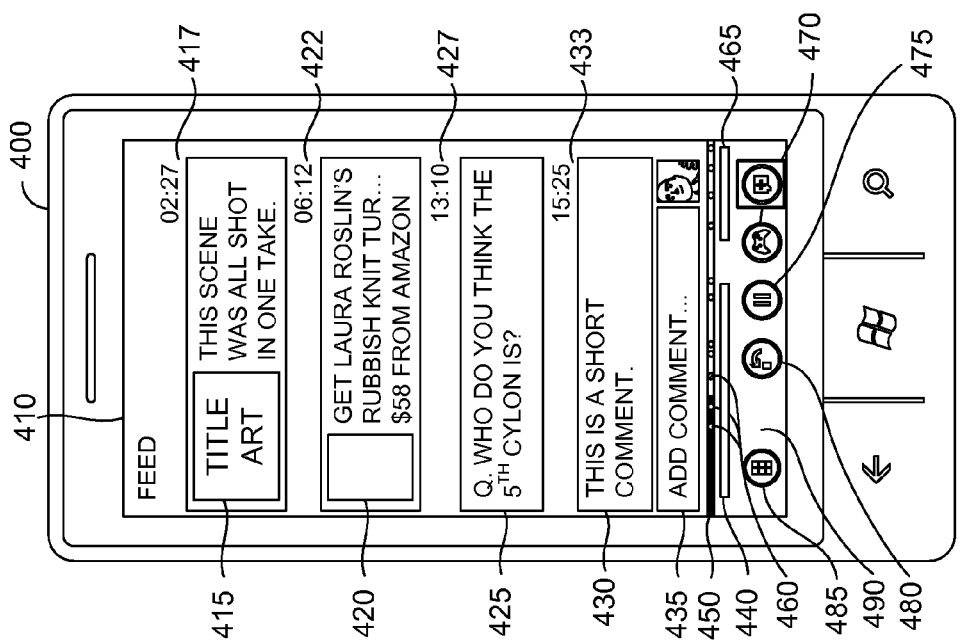
FIG. 4 is a diagram showing a companion device displaying a feed comprising time-sequenced events, in accordance with an embodiment of the present invention.

FIG. 4 shows a companion device 400 displaying a feed 410 comprising time-sequenced events. The events in the feed may be displayed in synchronization with a media playing on a separate device, like a game console. In other words, as the media presentation reaches a point associated with the time on the event then event appears to the user in the feed. Because the events are time coded to the media content they can be prepared in advance and only presented once the media begins playing. Other events may occur in real time as they are generated. For example, friend's comments may appear in nearly real time as they are published if the content is live. In one embodiment, the feed maybe scrolled. Each item or event within the feed is associated with a time within the media. In this case, the media is Battlestar Galactica, Season 1, Episode 4.

The first feed item is a commentary event 415. The director's commentary is associated with the time code 417. They director's commentary provides additional information about a scene occurring near the time code. The user may specifically subscribe to an application that pushes director's information to the feed. By selecting the commentary event 615, the user may be shown additional commentary details, if any are available. In one embodiment, the user is taken to a new screen to be shown the commentary details.

The next feed item is a contextual advertisement 420 that relates to the media. The advertisement is associated with time code 422.

The next feed item is a poll question 425 asking, "Who do you think the Fifth Cylon is? Users are able to respond to the poll question by selecting it, which could open a poll response interface. The response interface allows the user to select a poll answer. The current poll results may be shown in response to the selection. In one embodiment, only answers from a user's friends are shown.

The poll question and other activities may be generated through a special creator interface. In one embodiment, the creator interface is accessed by a developer that associates activities with the media content within the companion experience ecosystem. In this case, the activities may be accessed by all users of the application. In one embodiment, the activity may be accessed by all users, but answers are only shared with the user's social network. For example, the answer to poll questions may be shared only with a user' connections in one or more social networks. Friends within a gaming community are one example of a social network.

In another embodiment, anyone may use the creator interface to create activities and events that may be published to the world or just friends.

The final feed item is a short comment 430. The feed could also include comments of any length. A short comment fits on a single line. Longer comments may include ellipses to indicate more of the comment may be accessed by selecting the comment. Other indications, such as a drop down arrow could be included with longer comments. The comment, poll question, and other feed items may be drawn from those published by friends within the user's social network. The comments may also be from a subset of friends, for example, a group of friends that are fans of a TV show.

In addition to viewing the items, the user could create a feed item by entering text into the comment box 435 and posting the comment. The feed interface includes a description of the media or content associated with the feed. In this case, the feed is associated with an episode of Battlestar Galactica, which is shown on a different display device that is synchronized with the companion device 400. For example, the user could be watching Battlestar Galactica through a title playing on their game console while simultaneously viewing the feed on their companion device 400. Progress bar 450 and time counter 465 show the progress of the media being played on a separate device. The dots 460 within the progress bar 450 each correspond to a feed item available to the user. Dots are added as additional events or feed items are added, by the user or companion device 400 or other users. In one embodiment, the event associated with the dot is shown when the dot is selected. For example, the user could select a dot and be shown an associated comment.

Selecting the control icon 470 activates several web media functions that allow the user to control the media playing on the primary device using the companion device. Upon selection of the control icon 470, a control user interface that allows the user to interact with the content displayed by the game console is presented. The control interface may include a gesture area where the user can make touchpad gestures that manipulate content playing on the game console.

Selecting the pause button 475 will pause the media presentation. Selecting the rewind button 480 will rewind the media. In one embodiment, the rewind button causes a skip back. For example, the media could skip back eight seconds each time the rewind button 480 is pushed. Selecting button 485 will return the application to a home page or welcome activities page.

The contextual advertisement 420 is illustrated. The contextual advertisement is for a product shown within the media content. In the example shown, the advertisement is for a sweater worn by Laura Roslin, a character in Battlestar Galactica. The time synchronization 422 causes the advertisement to be shown at 6:12 of the media presentation. Though not required, the time synchronization may correspond with when the product appears in the media content. The user may open an interface to receive more information about the product and even purchase the product by selecting the contextual advertisement 420. Selecting the advertisement may take the user to an online store or open a shopping application.

The contextual advertisement 420 may be generated by an advertising service associated with the feed application. The user may opt-in to receive the contextual advertisements.

Other feed items that are not shown, include an activity item that allows the user to complete an associated activity, like play a game. The feed items could be linked to a URL that is displayed in a canvas generated by a companion application upon selection of the feed items.

Figure 5:
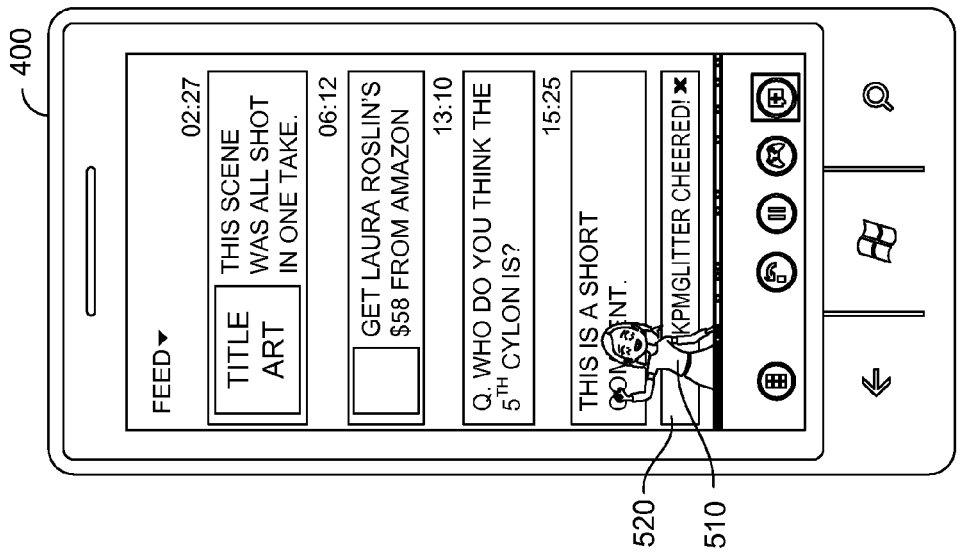
FIG. 5 is a diagram showing a newly added emote when the emote is first added to the feed, in accordance with an embodiment of the present invention.

FIG. 5 shows a newly added emote when the emote is first added to the feed in synchronization with the media. In FIG. 5, an emote is surfaced in a special way when the media reaches the time sequence corresponding to the event. Specifically, when the emote "KPMGLITTER cheered" 510 is first added to the feed, an avatar associated with KMPGLITTER is displayed simultaneously with the emote 510. After a designated amount of time, perhaps a few seconds, the avatar disappears and the emote takes its place in the feed 620 (shown in FIG. 6). A similar display could be used when a comment, or other event, is added to the feed.

Figure 7:
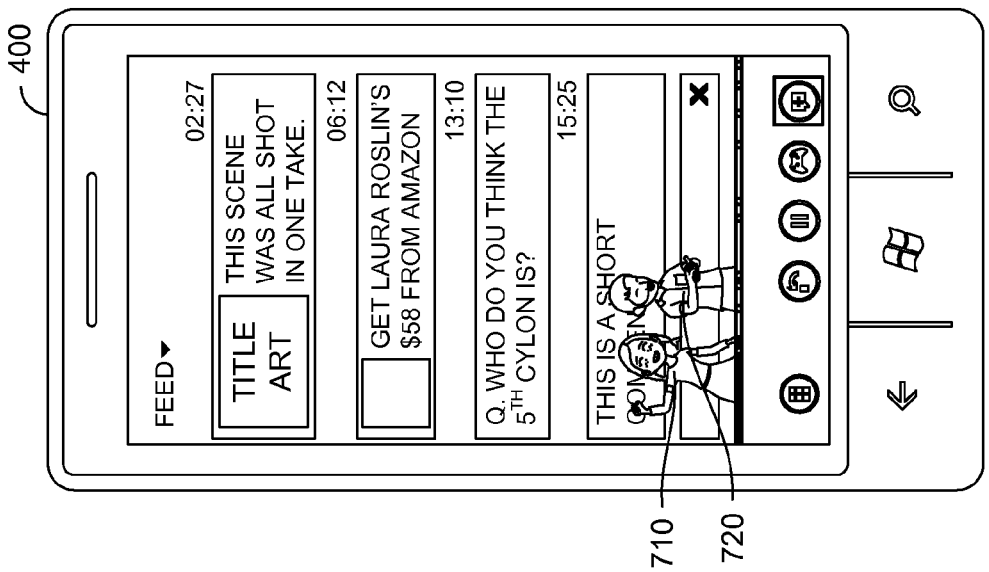
FIG. 7 is a diagram showing two emotes being added to the feed at roughly the same time, in accordance with an embodiment of the present invention.
Figure 6:
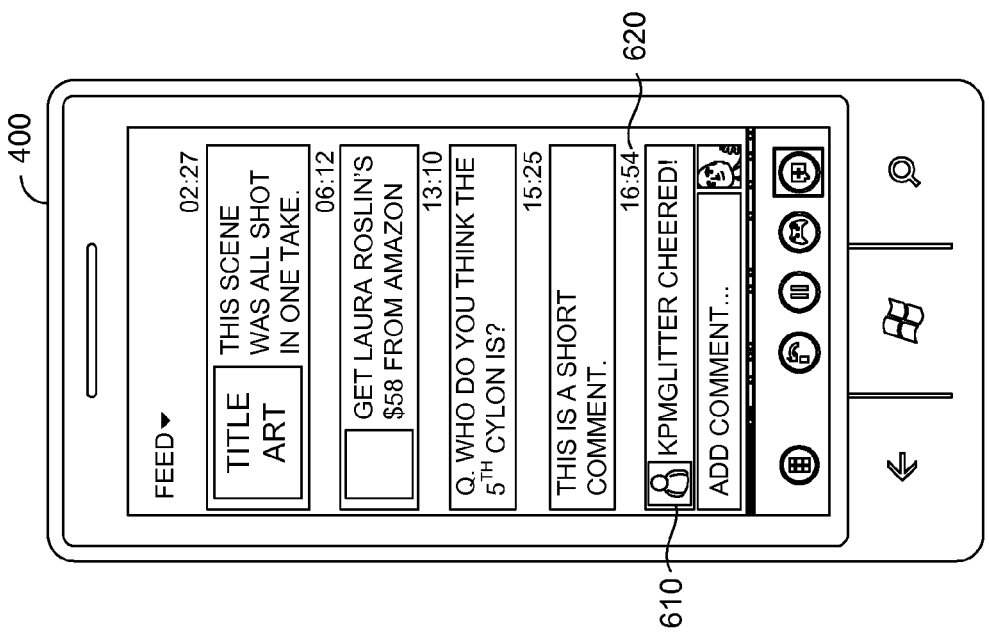
FIG. 6 is a diagram showing a companion device displaying a feed comprising time-sequenced events, in accordance with an embodiment of the present invention.
Figure 9:
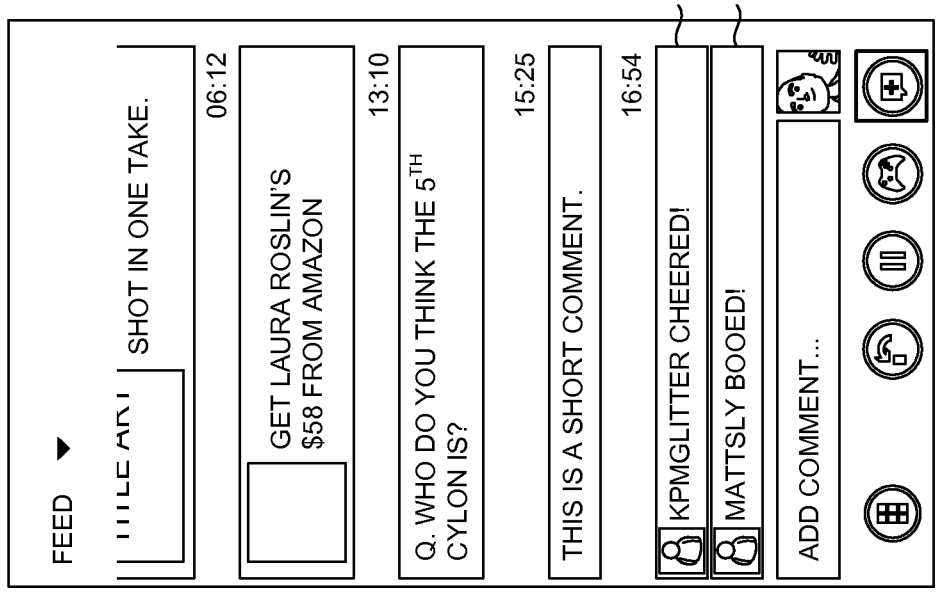
FIG. 9 is a diagram showing two avatars associated with different emotes having similar time synchronization displayed as separate feed items, in accordance with an embodiment of the present invention.
Figure 8:
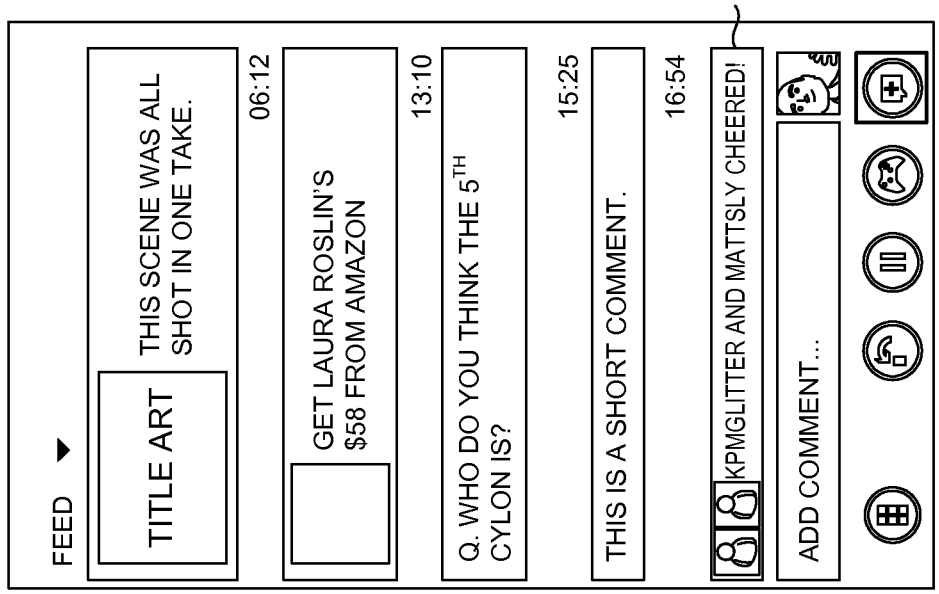
FIG. 8 is a diagram showing identical emotes having similar time synchronization combined into a single feed item by combining multiple avatars in the single feed, in accordance with an embodiment of the present invention.

FIG. 7 shows two emotes being added to the feed at roughly the same time. In this case, avatar 710 and avatar 720 have similar time-sequence codes and are displayed at the same time. After a few moments, the avatars disappear and feed items corresponding to the event content are displayed. When the emote is identical, the two avatars and user information may be combined in a single feed 810 item as depicted in FIG. 8. As can be seen, feed item 810 indicates that KPMGLITTER and MATSLY both cheered. Their corresponding icons are both shown as part of the feed item. When different emotes are input by different users nearly simultaneously, separate feed items may be created for each. In FIG. 9, a separate feed item 910 is shown for KPMGLITTER and MATSLY 920. Each feed item displays a different emote.

Figure 10:
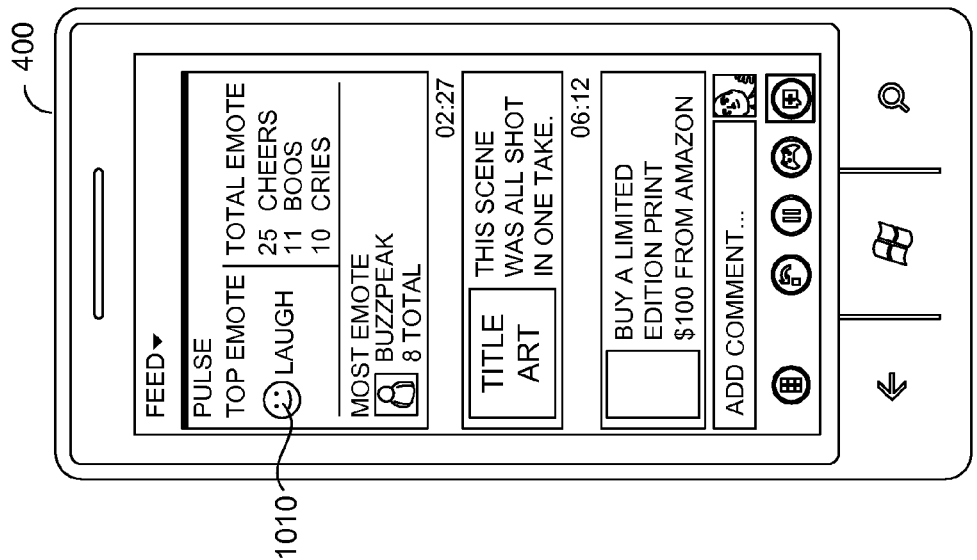
FIG. 10 is a diagram showing a pulse feed item that summaries emotes for an entire media content, or for a section of the content, in accordance with an embodiment of the present invention.

Turning now to FIG. 10, a pulse feed item 1010 that summaries emotes for an entire media content, or for a section of the content, is illustrated, in accordance with an embodiment of the present invention. As can be seen, the pulse item 1010 summarizes the emotes associated with the show to that point in the show. It breaks down the total cheers, boos, and cries. It also indicates the user who has the most emotes which in this case is BUZZSPEAK with eight total emotes. The pulse feed item 1010 also displays the top emote, which in this case is laugh. In one embodiment, the summary pulse for the entire content is shown at the top of the feed and has an associated time stamp of 00 indicating that it was cumulative for the entire media content.

Figure 11:
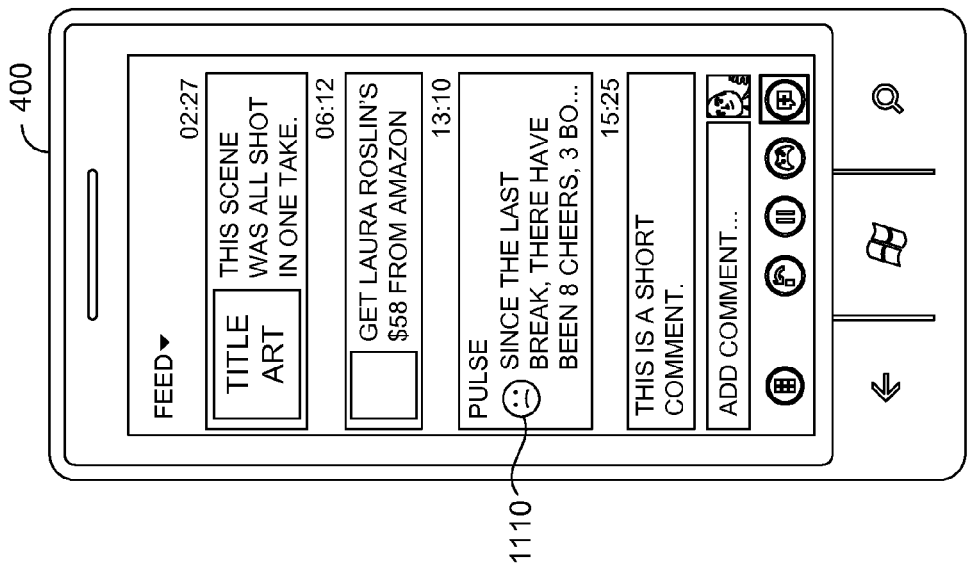
FIG. 11 is a diagram showing an in-feed pulse, in accordance with an embodiment of the present invention.

In FIG. 11, an in-feed pulse is shown. Pulse 1110 summarizes emote data associated with the content shown since the last break, or commercial. In this case, it indicates that there have been 8 cheers, 3 boos, and 2 cries since the last break. Clicking on the pulse feed 1110 will reveal more detailed information as is shown in FIG. 12.

Figure 12:
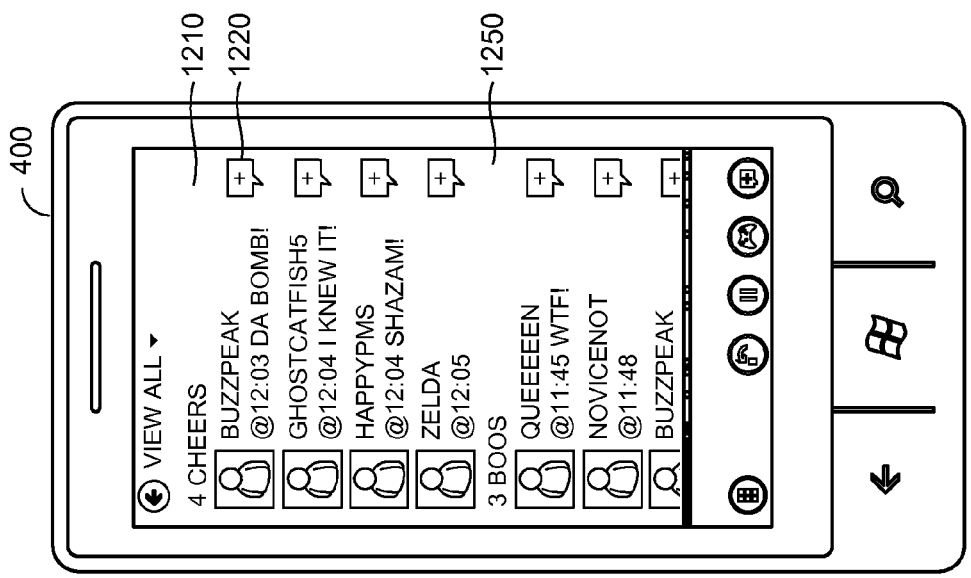
FIG. 12 is a diagram showing an emote details page, in accordance with an embodiment of the present invention.

The emote detail page 1210, in FIG. 12, shows the emotes broken down into categories along with the person associated with the emote and user comments associated with the emote. For example, the cheers section 1220 shows four cheers with detailed information, and the boos section shows three boos 1250. An exemplary emote detail indicates the user, such as BUZZSPEAK, the time sequence, as in 12:03, and an associated comment, "This is da bomb!" Not all emotes need to be associated with a comment and a comment may be a separate item that is not associated with an emote.

Figure 13:
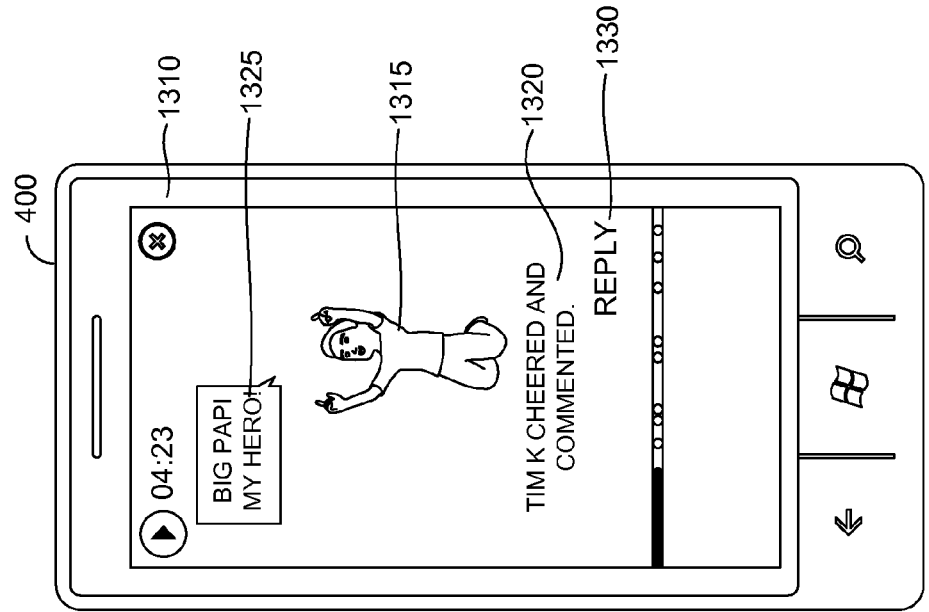
FIG. 13 is a diagram content details, in accordance with an embodiment of the present invention.

FIG. 13 shows comment details. The comment details page 1310 may be opened by selecting a specific event shown in a different interface, such as the emotes shown in FIG. 12. The comment detail includes the user avatar 1315, the emote 1320, and the comment 1325. There is an option to reply to the comment by selecting the reply button 1330.

Figure 14:
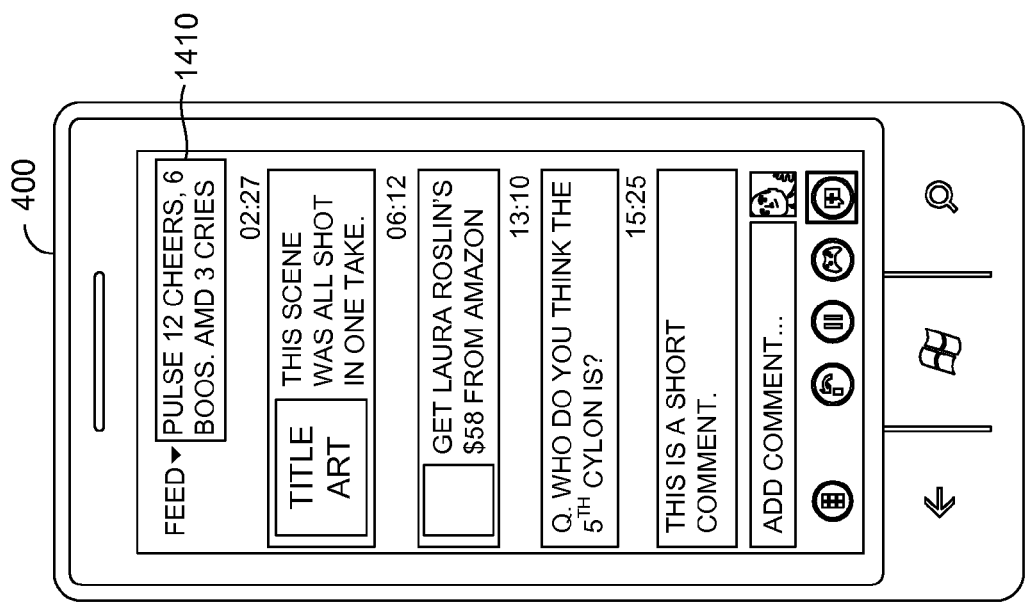
FIG. 14 is a diagram showing a pulse counter, in accordance with an embodiment of the present invention.
Figure 16:
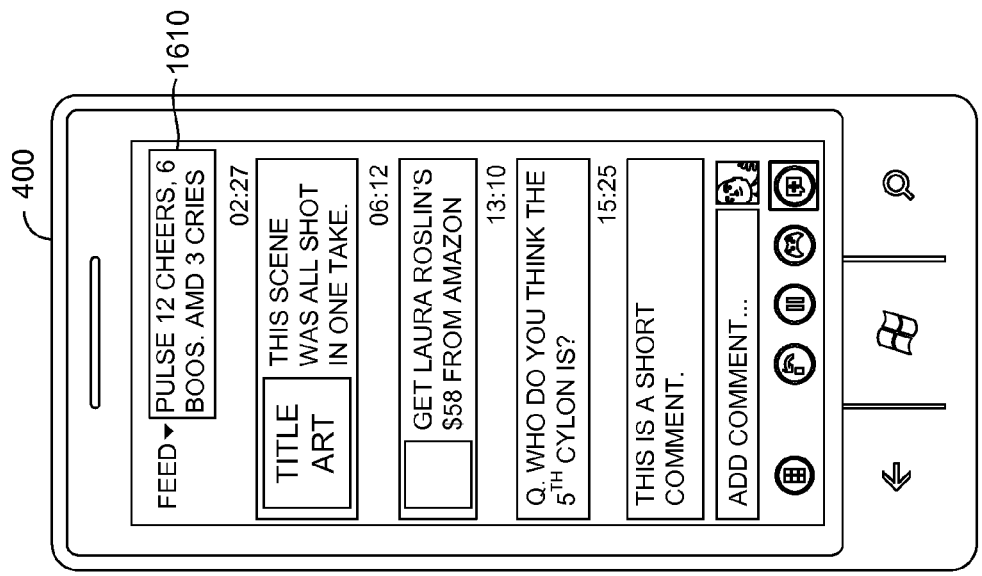
FIG. 16 is a diagram showing an updated pulse counter, in accordance with an embodiment of the present invention.
Figure 15:
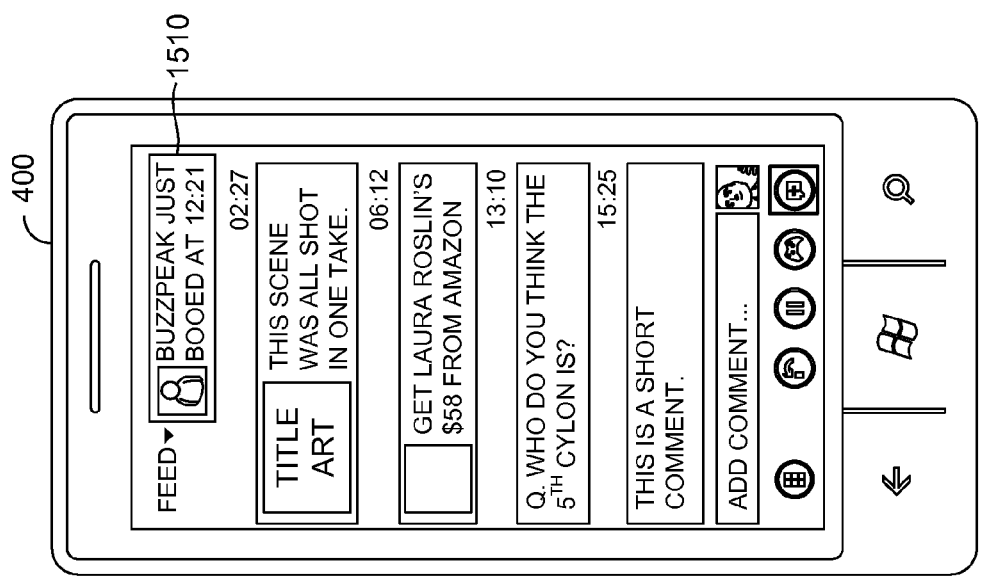
FIG. 15 is a diagram showing an emote surfacing through the pulse counter, in accordance with an embodiment of the present invention.

Another embodiment of a pulse items that counts emotes is shown in FIGS. 14-16. In FIG. 14, the pulse counter 1410 is shown at the top of the feed. In this embodiment, the pulse counter 1410 remains at the top of the feed and is displayed even as the feed scrolls. The user may be given the option to hide the pulse in some embodiments. In FIG. 15, a new emote 1510 is surfaced through the pulse counter, briefly obscuring the emote summary. In this case, the new emote 1510 is BUZZSPEAK boos. In FIG. 16, it can be seen that the pulse counter 1610 has been updated to include six boos rather than the five boos shown in FIG. 14. In one embodiment, the emotes are not shown in the feed when the pulse counter is also transitioned to surface emotes as they occur.

Figures 17, 18:
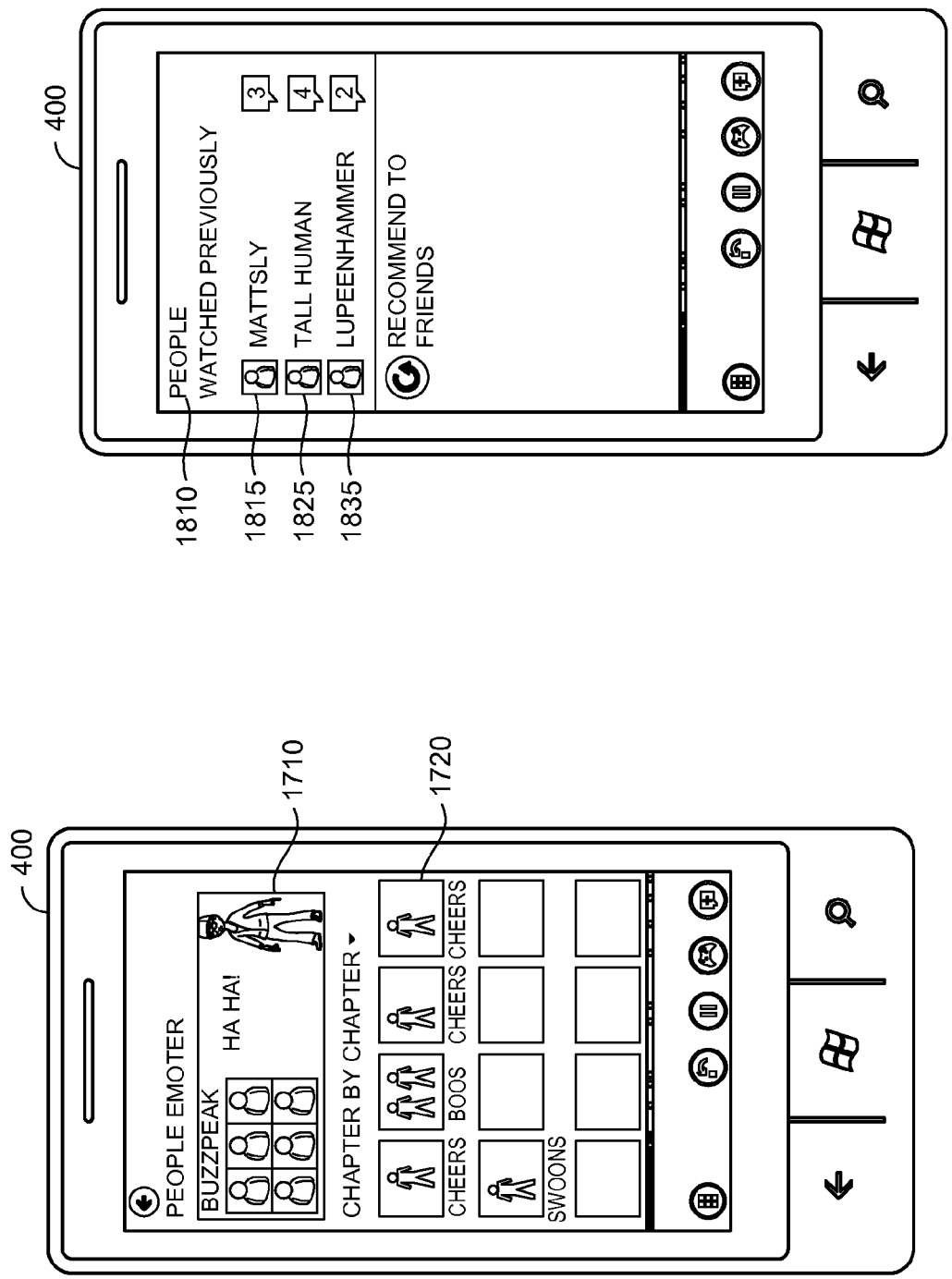
FIG. 17 is a diagram showing an emote details page, in accordance with an embodiment of the present invention.
FIG. 18 is a diagram showing the people details page, in accordance with an embodiment of the present invention.

Turning now to FIGS. 16 and 17, another way to access emote details is shown. The pulse counter 1610 is shown again in FIG. 16. Upon selecting the pulse counter 1610 in FIG. 16, the details page shown in FIG. 17 is displayed. The people emote section 1710 shows emotes associated with people. By selecting an individual icon, the emotes generated by a particular user are highlighted. In this case, BUZZSPEAK is selected and it can be seen that his most recent emote was "laugh" with a 15:45 time code. In the chapter selection section 1720, the emotes associated with a chapter may be surfaced on a chapter-by-chapter basis by selecting the chapter. In one embodiment, the dominant emote for each chapter is displayed. All of the emotes for the particular chapter may be surfaced by selecting the chapter. In the people emote section 1710, the most recent emote for a person may be displayed upon selecting a particular person. In another embodiment, the user's most common emote or dominant emote may be displayed.

By selecting a person in the people emote section 1710 in FIG. 17, or through some other interface on the feed, a people details page 1810 may appear. As shown in FIG. 18, a particular user's details include an avatar, the user name, and the number of comments or emotes made by the person in association with the active media. In this case, MATSLY 1815 has made three comments or emotes, TALLHUMAN 1825 has made four, and the LUPEENHAMMER 1835 has made two. A user may recommend a particular person to another person to help facilitate building social relationships between users. Thus, if a particular user's commentary is particularly amusing or entertaining; the commentary may be recommended to a friend who may then form a relationship with the author of the comment. In some instances, the user must grant permission for the additional person to follow them.

Upon selecting MATSLY 1815 in FIG. 18, details about MATSLY's comments and emotes associated with the active media are shown, as in FIG. 19. In this case, three comments 1910 are shown along with MATSLY's avatar.

Figure 21:
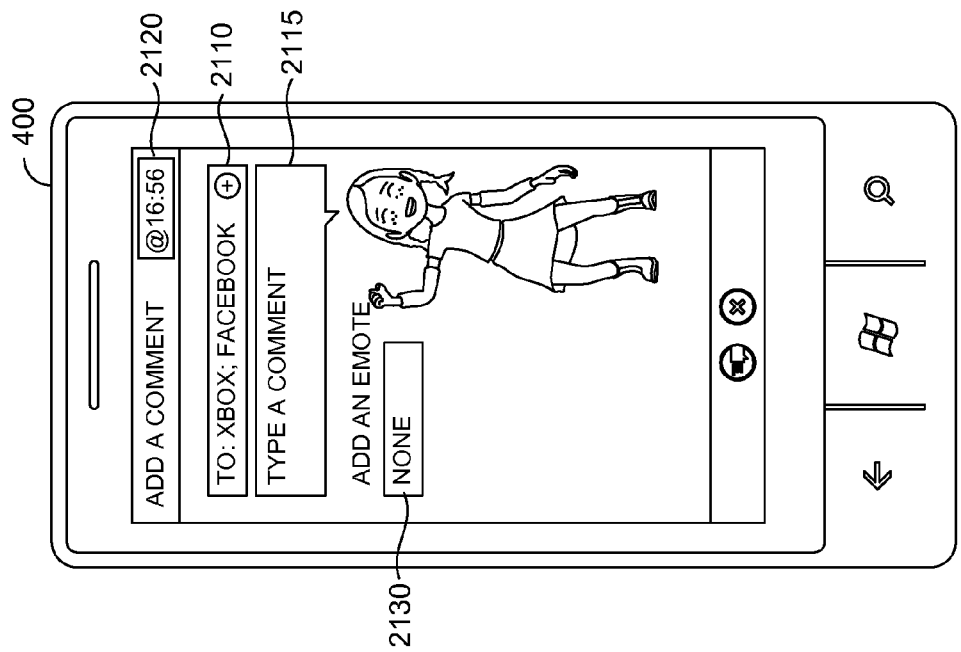
FIG. 21 is a diagram showing a comment details page that allows the user to generate comments to add to the feed, in accordance with an embodiment of the present invention.

In addition to linking emotes to a portion of a media content, comments can also be linked to a media content using time-sequence coding. In some cases, emotes and comments can form a single event. FIGS. 20 and 21 describe a comment interface. In order to create a comment, the user enters text into the comment box 2010 shown in FIG. 20. Upon entering the comment, the user may be taken to a add comment box interface in FIG. 21. In another embodiment, the user selects the comment box 2010 without first entering text to open the add comment interface. The time 2110 refers to a portion of the content with which the comment is to be synchronized. The time 2110 may be set to match the progress in the title at the time when the comment box 2210 was selected. The "To:" box 2110 shows where the comment will be published. In this case, the comment will be published to Facebook and the Xbox game service. The user is also able to add an emote by selecting the emote box 2130. The user generates a comment by entering text in the comment text box 2115. In one embodiment, the user is able to first type a comment in the box 2010 and whatever is typed in box 2010 is initially shown as a preliminary comment in box 2115. The user may then elaborate or edit the preliminary comment.

Figure 22:
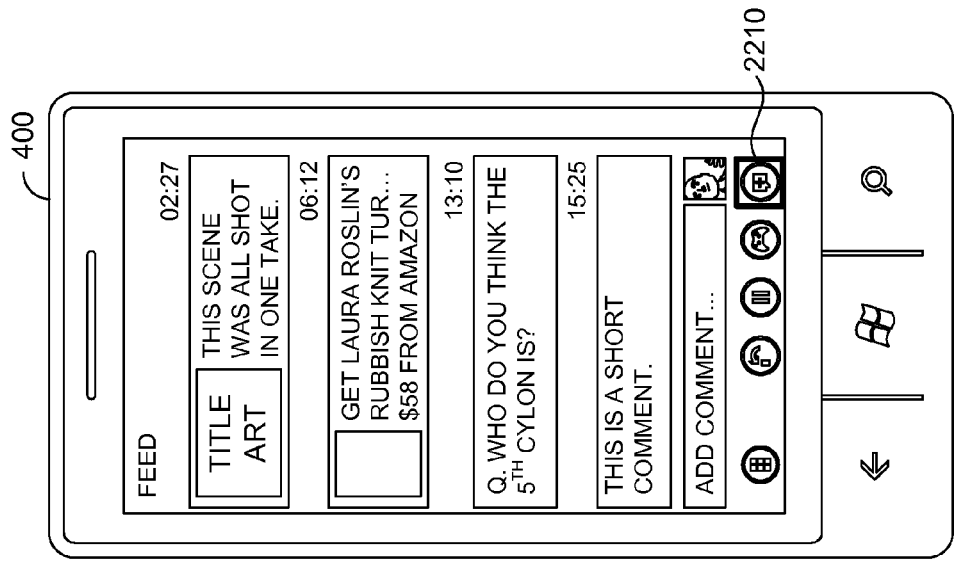
FIG. 22 is a diagram showing an event notification, in accordance with an embodiment of the present invention.

FIG. 22 illustrates a notification that communicates a new event has been added to the feed. In FIG. 22, the user selects notification button 2210, which may appear only when a new feed item or event is added the feed and the user is not currently viewing the feed or a screen where the event is clearly surface. Alternatively, the event may not be a feed item. For example, the event could mean that a new person has joined a chat or that an activity has been updated. Selecting the notification 2210 button will provide more information about the event that lead to the notification. For example, the comment detail page, such as shown in FIG. 13 or the feed as shown in FIG. 4 and elsewhere might be displayed.

Figure 23:
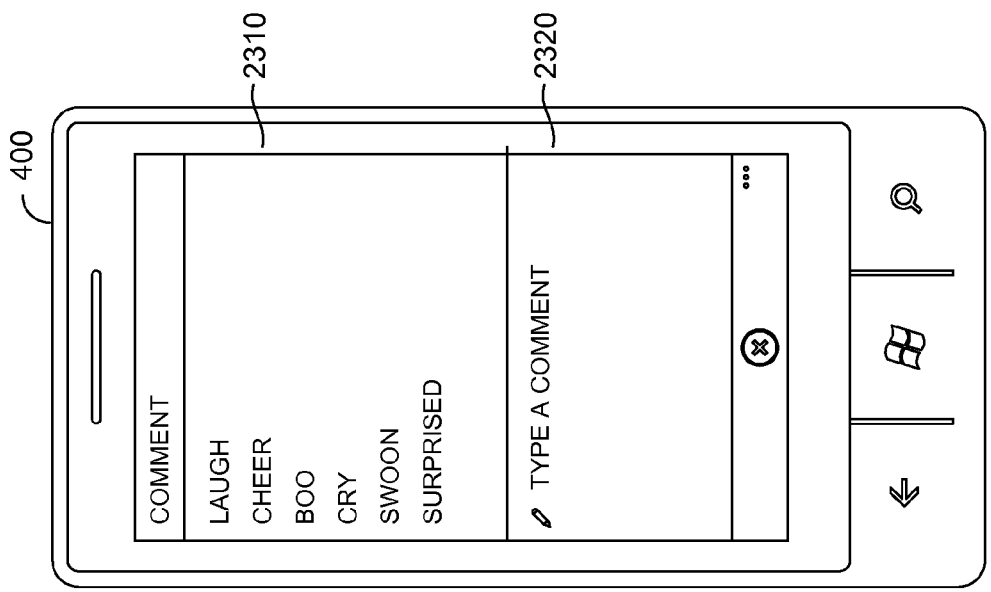
FIG. 23 is a diagram showing an emote creation page, in accordance with an embodiment of the present invention.

The emote interface 2310 is presented, as shown in FIG. 23 to associate an emote. The user can select one of several emotes including laugh, cheer, boo, cry, swoon, and surprise. In addition, the user may type their comment in text box 2320. Once the user has made their selection and typed their comment, they can publish it. As mentioned previously, the comment can be published to a social media outlet such as Twitter or Facebook. In addition, the comment may be published to a service associated with the game console. Members of the service provided by the game console may be able to access the comments of their acquaintances within the game console service.

Figure 24:
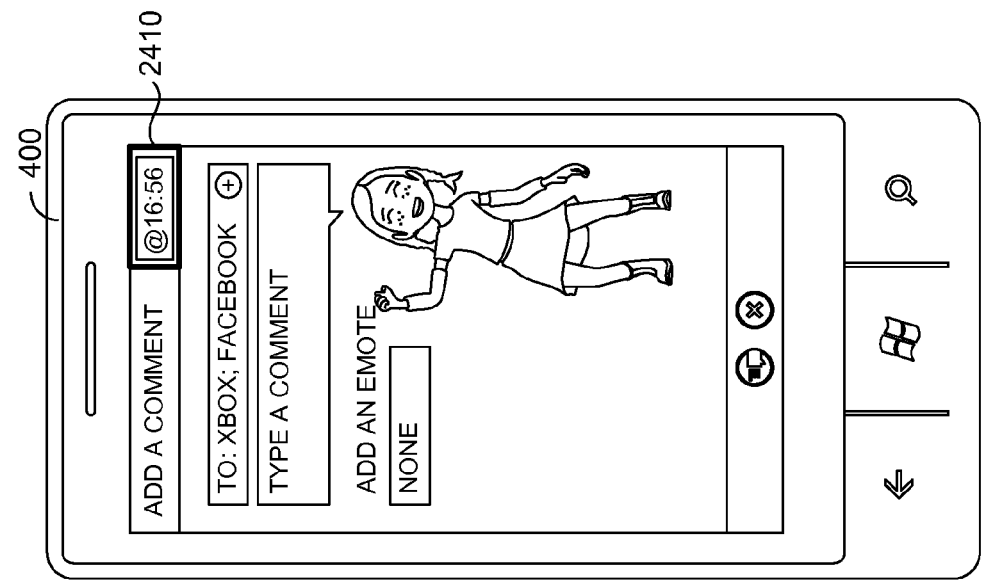
FIG. 24 is a diagram showing one way to access a time synchronization detail page through the comment generation interface, in accordance with an embodiment of the present invention.
Figure 25:
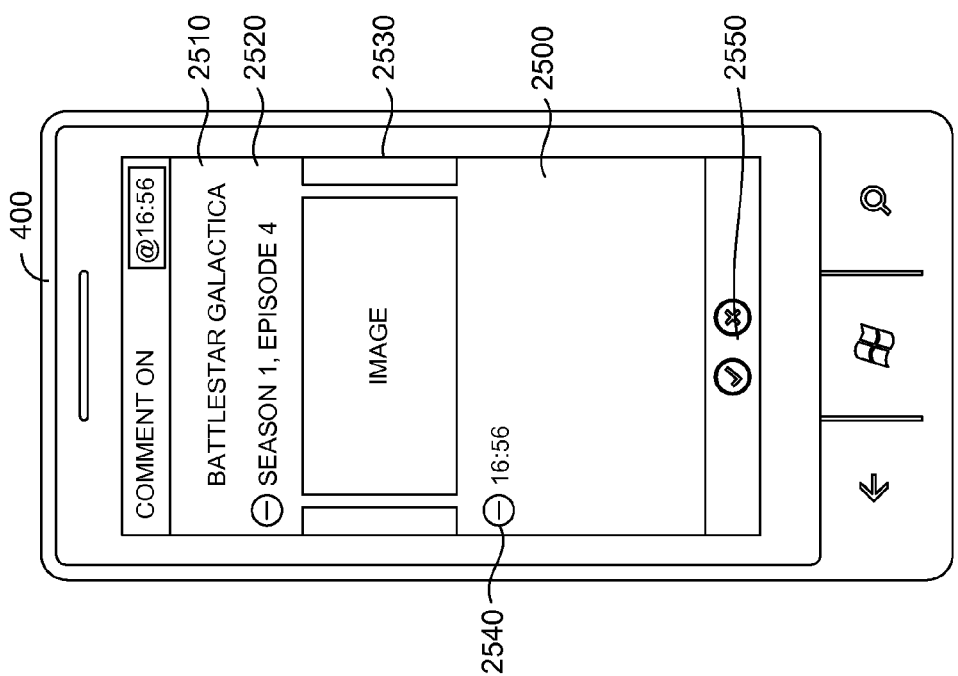
FIG. 25 is a diagram showing a time synchronization details page through which the time synchronization for a feed item may be adjusted, in accordance with an embodiment of the present invention.

In one embodiment, the user is able to refine the time synchronization associated with a comment by selecting the time indicator 2410 shown in FIG. 24. In another embodiment, clicking on the time indicator opens a time details page. Sometimes the user clicks to add a comment a few seconds after the scene related to the comment has passed. The time details page allows the user to rewind the timestamp so it is in the right place. FIG. 25 shows a timestamp details page that allows a user to edit the timestamp associated with the event. The time details page 2500 includes the content series *Battlestar Galactica* 2510, the episode 2520, and the time synchronization interface 2540. In addition, a preview thumbnail 2530 shows what was going on within the media content at that time indicated. The user is then able to scroll horizontally through various schemes to pick the time or scene with which the comment should be associated. The user could also adjust the time manually in time interface 2540. The user is able to publish the comment or delete it using the control 2550.

Figure 26:
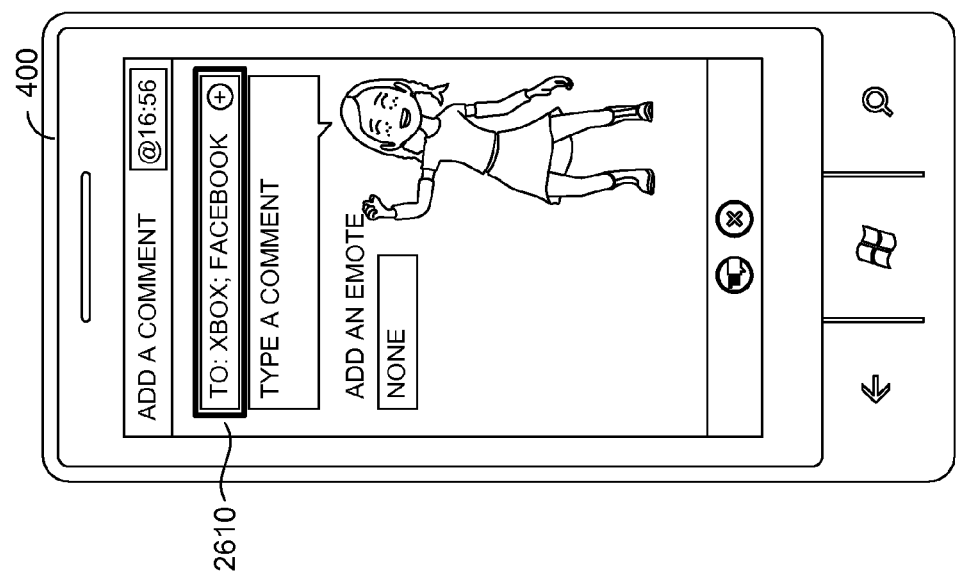
FIG. 26 is a diagram showing how to access a publication details interface, in accordance with an embodiment of the present invention.
Figure 27:
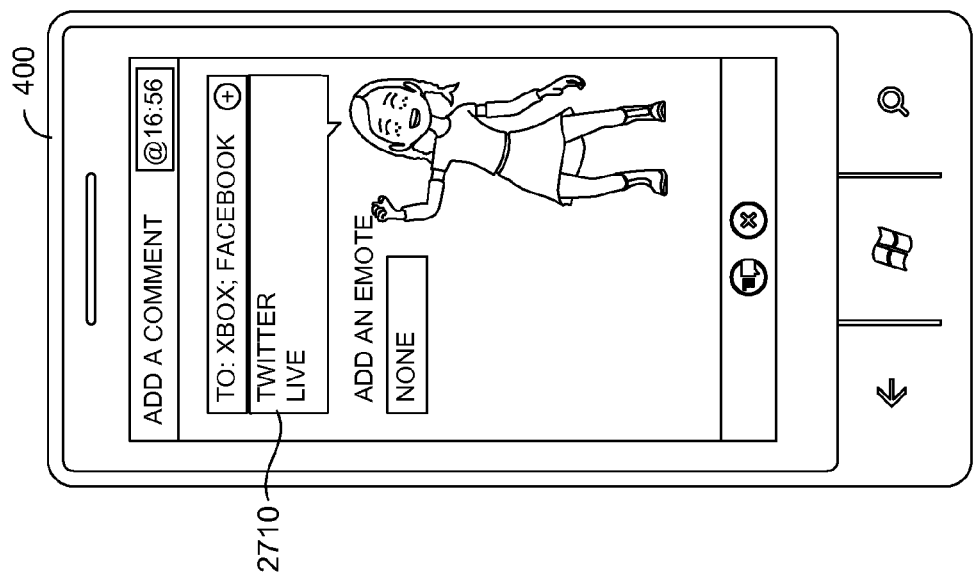
FIG. 27 is a diagram showing publication details page that allows the user to specify where a feed item, such as a comment, is published, in accordance with an embodiment of the present invention.

By selecting the "To:" box shown 2610 in FIG. 26, additional publication options may be selected by the user in box 2710 shown in FIG. 27. As can be seen, the publication details page in FIG. 27 lets the user change the publication details. For example, the user could select Twitter or Live for publication options. The user could also remove Facebook or the Xbox service as the publication destinations.

Figure 28:
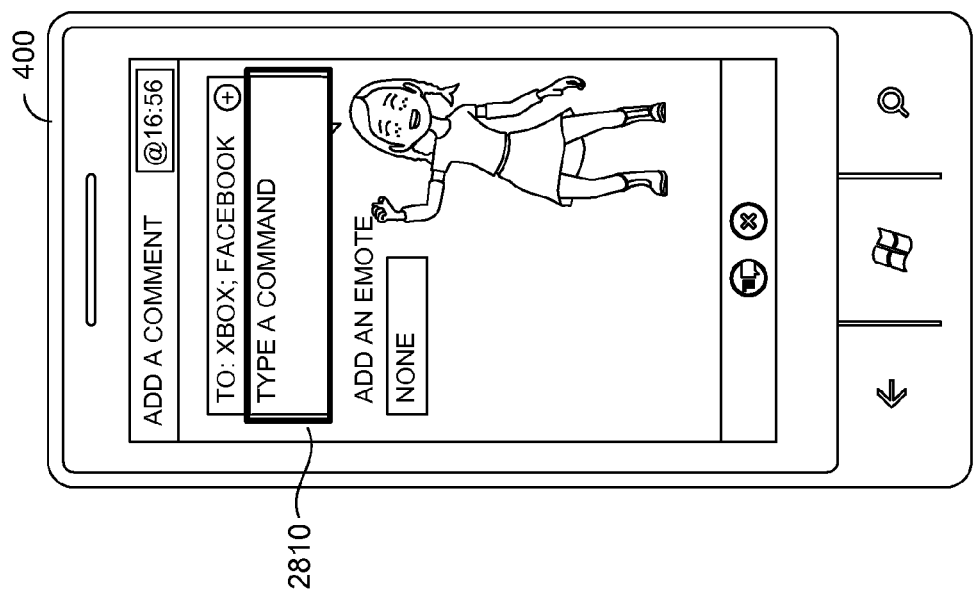
FIG. 28 is a diagram showing text details, is published, in accordance with an embodiment of the present invention.

FIG. 28 shows the add text control page. The user can transition directly to comment editing after specifying the publication options. The user does not need to go back to the feed page every time a detail page is accessed and data entered. For example, once selecting an emote from the details page; the user could transition directly to comment details or time synchronization.

In one embodiment, the user is able to click on a post within their social network's feed and be taken directly to the activity related to the post. In this example, the user can click on the comment "that just happened" and be taken to feed for that content, in this case an episode of *Battlestar Galactica*. In addition to the feed for the episode, the use is given the option to start watching the episode through a media service on a primary device. In other words, by clicking on the social network link on their companion device the user is entered into the activity on the companion and the related media content is prepared for presentation on the primary device (e.g., game console). If the user does not have rights to the media content, the user may be given the option to purchase the media content or join a service through which the media content may be accessed. When the game console determines that the user has rights to the media it may be presented. Other activities related to the media content may also be shown to the user on the companion device or on the display associated with the base device.

Figure 29:
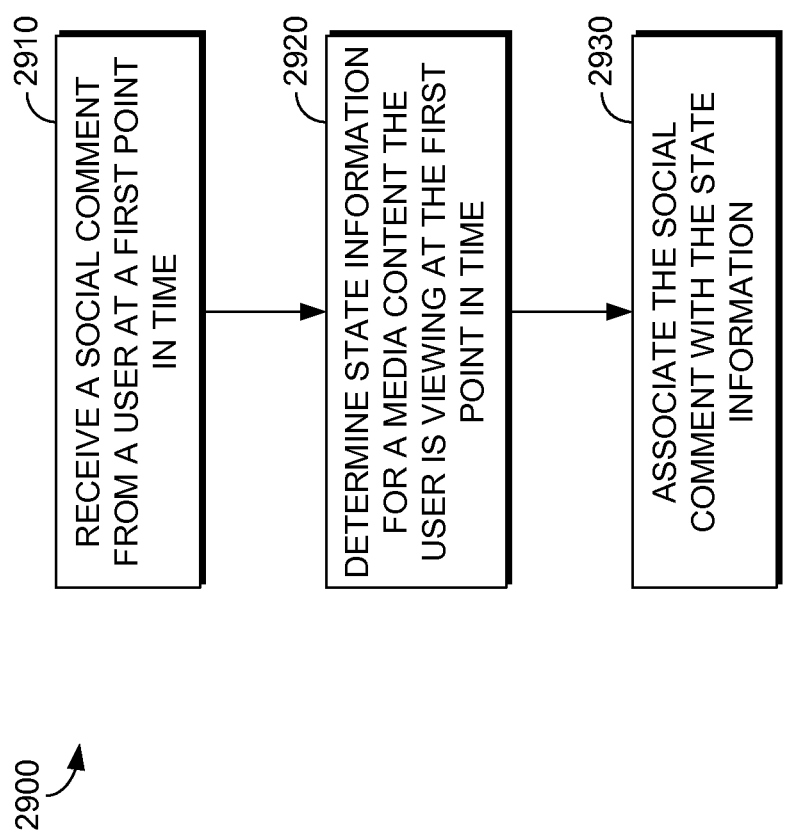
FIG. 29 is a flowchart showing a method of synchronizing social comments with a media content, in accordance with an embodiment of the present invention.

Turning now to FIG. 29, a method 2900 of synchronizing social comments within media content is shown, in accordance with an embodiment of the present invention. At step 2910, a social comment is received from a user at a first point and time. The social comment may have been generated by the user and published to a social network. Exemplary social comments include social posts, micro posts, emotes, and the like.

At step 2920, state information for a media content the user is viewing at the first point and time is determined. The stated information may be determined by querying a media console that generated the display. The query may come from a server or companion device that is presently manipulating or editing the social comment.

At step 2930, the social comment is associated with the stated information. In one embodiment, the stated information is a progress point for the media content. This stated information may indicate the viewer is a certain time into a time delimited media content such as a video. Or at a virtual location or level within a game.

As mentioned, the stated information may be associated with a social comment by modifying metadata associated with the server, or by inserting the stated information directly into the text or body of the social comment. In one embodiment, the stated information is inserted in the form of a navigable link. In other words, another user or the same user that generated the secondary content may select the link and be presented the media content at a progress point that is consistent with the stated information.

Figure 30:
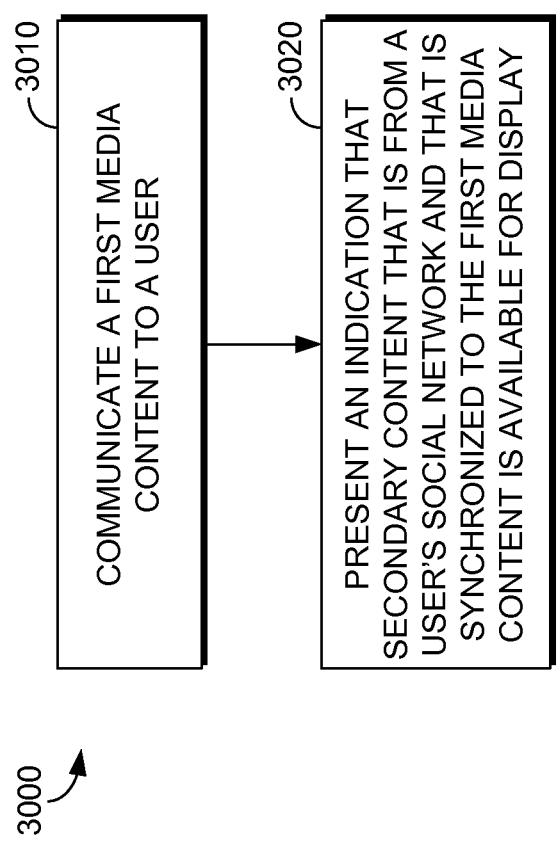
FIG. 30 is a flowchart showing a method of synchronizing social comments with a media content, in accordance with an embodiment of the present invention.

Turning now to FIG. 30, a method 3000 of synchronizing media content with secondary content is shown, in accordance with an embodiment of the present invention. At step 3010, a first media content is communicated to a user. Exemplary media content include games, videos, and recorded television shows.

At step 3020, an indication is presented that secondary content from a user's social network is available for display to the user. The secondary content is synchronized with the first media content. In one embodiment, the indication is a dot or line adjacent to a progress bar indicating the progress of the first media content. A user may access the secondary content by hovering on or otherwise interacting with the indication.

In another embodiment, the indication is a summary of multiple secondary content events that are available. Secondary content events that are associated with a similar progress point within the media may be consolidated together and presented together. For example, 15 likes and dislikes from individual users within the social network could be summarized 7 likes and 8 dislikes without indicating which users they came from. To gather more information, the user could select the likes and dislikes summary and be taken to a page showing the individual likes and dislikes for that particular progress point. In another embodiment, the indication is an icon associated with a particular user that is automatically surfaced or displayed when the media or progress of the first media content matches the time code for synchronization data within the secondary content.

Figure 31:
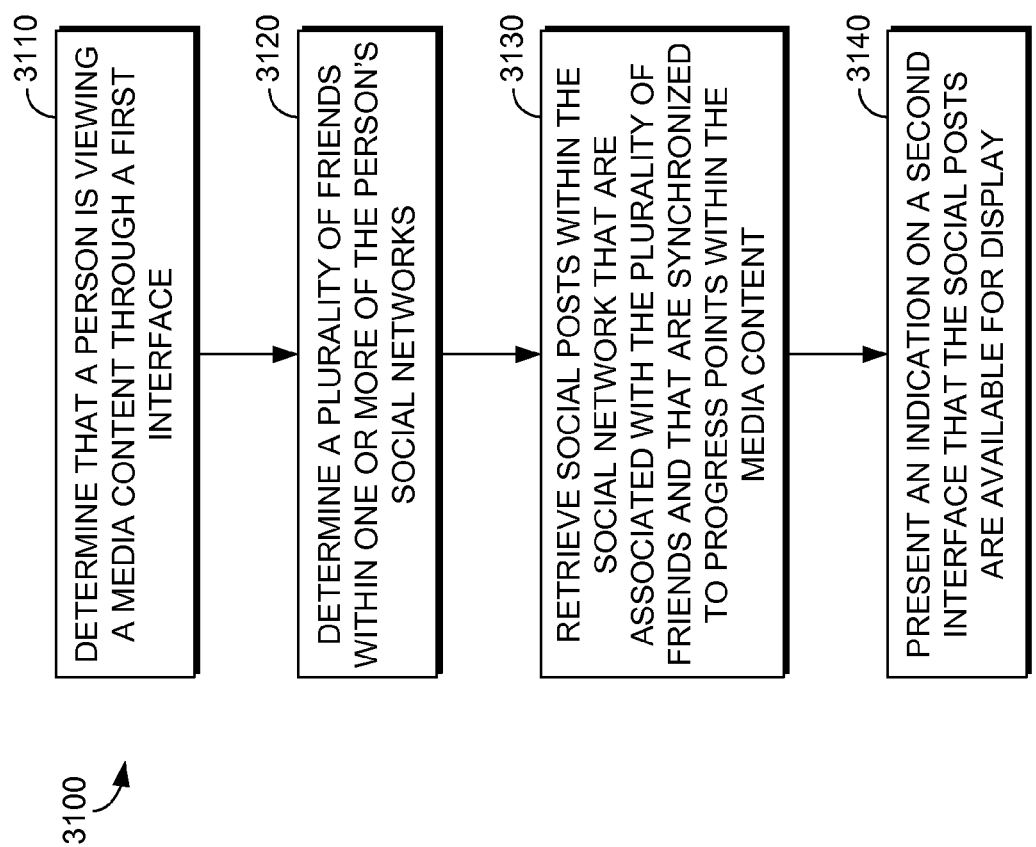
FIG. 31 is a flowchart showing a method of synchronizing social comments with a media content, in accordance with an embodiment of the present invention.

Turning now to FIG. 31, a method of synchronizing media content with secondary content is shown, in accordance with an embodiment of the present invention. At step 3110, a person is determined to viewing a media content through a first interface, the first interface may be presented on a television displaying the interface output by a game console, media console, personal computer or other computing device.

At step 3120 a plurality of friends within one or more of the person's social networks is determined. A user may need to provide social network identification and authentication information so that their friends may be determined.

At step 3130, social posts within the social network are retrieved if they that are associated with an individual from the plurality of friends and are synchronized to the media content. Thus, social posts related to the currently viewed media content are retrieved while unrelated social posts may be ignored. In some embodiments, advertisers or promoted social posts may be included when the social posts are retrieved. These may be considered as coming from friends for the purpose of the disclosure, even though they may not have an actual friend relationship within the social network.

At step 3140, an indication is presented on a second interface that the social posts are available for display. The second interface may be displayed on the same display device as the first interface. For example, the first interface and second interface could be adjacent. In another embodiment, the second interface was displayed on a companion device that is separate from the display device on which the interface is displayed.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media having one or more computer executable instructions when executed by a computing device perform a method of synchronizing media content with emotes, the method comprising;
    outputting for display on a primary device a scene of a first media content to a user for a first time period;
    determining a plurality of friends for the user within a social network;
    identifying emotes posted by the plurality of friends related to the scene in the first media content by analyzing metadata associated with the emotes, wherein the emotes are stored in computer storage associated with the social network, and wherein the emotes were posted to the social network during a second time period that is before the first time period;
    retrieving over a network connection the emotes from the computer storage associated with the social network, the emotes related to the scene of the first media content and synchronized to progress points within the first media content, wherein the emotes comprise individual emotes associated with at least three different emotions;
    while the scene is being output for display to the user on the primary device, outputting for display on a companion device a first indication communicating a first total count of emotes from emotes posted by the plurality of friends and related to the scene of the first media content that express a first emotion, a second indication communicating a second total count of emotes from the emotes that express a second emotion, and a third indication communicating a third total count of emotes from the plurality of emotes that express a third emotion, wherein the first emotion, second emotion, and third emotion are different; and
    outputting for display on the companion device a feed comprising the emotes, wherein the emotes are output in synchronization with the first media content being output on the primary device.

2. The media of claim 1, wherein the method further comprises automatically displaying an individual emote from the emotes when the first media content reaches a progress point matching a timestamp associated with the individual emote.

3. The media of claim 1, wherein the first emotion comprises disliking the first media content.

4. The media of claim 1, wherein the method further comprises outputting for display a spoiler warning when the user selects an emote for display having a timestamp associated with a progress point in the first media content not yet output for display to the user.

5. The media of claim 1, wherein the method further comprises receiving from the user a selection of the first indication and displaying an emote details interface indicating a friend from the plurality of friends who posted an individual emote expressing the first emotion.

6. The media of claim 5, wherein the method further comprises receiving from the user a selection of the friend in the emote details interface and presenting an updated interface highlighting emotes posted by the friend related to the first media content.

7. A method of synchronizing media content with emotes, the method comprising;
    determining that a media content is being output for display through a first display device to a person during a first time period;
    determining a plurality of friends within one or more of the person's social networks;
    identifying emotes posted by the plurality of friends related to the media content by analyzing metadata associated with the emotes, wherein the emotes are stored in computer storage associated with a social network, and wherein the emotes were posted to the social network during a second time period that is before the first time period;
    retrieving over a network connection from the computer storage associated with the social network the emotes, which are synchronized to progress points within the media content by the metadata; and
    while the media content is being output for display through the first display device, outputting for display on a companion device an indication indicating a first total count of emotes from the emotes that express a first emotion, a second total count of emotes from the emotes that express a second emotion, and a third total count of emotes from the emotes that express a third emotion; and
    outputting for display on the companion device a feed comprising the emotes, wherein the emotes are output in synchronization with the media content being output on the first display device.

8. The method of claim 7, wherein the method further comprises automatically displaying a social post from a plurality of social posts when the media content reaches a progress point matching a timestamp associated with the social post.

9. The method of claim 8, wherein the plurality of social posts comprise links identifying the progress points within the media content.

10. The method of claim 7, wherein the method further comprises receiving a selection of the indication and displaying an emote details interface indicating a user associated with each of the plurality of emotes.

11. The method of claim 10, wherein the media content is a video game and the progress points are levels within the video game.

12. The method of claim 7, wherein the media content is a video game and the progress points are locations within the video game.

13. A computing system comprising:
a processor; and
computer storage memory having computer-executable instructions stored thereon that, when executed by the processor, configure the computing system to:
output for display on a primary display device a first media content to a user during a first time period;
determine a plurality of friends for the user from within one or more social networks;
identifying emotes posted by the plurality of friends related to the first media content by analyzing metadata associated with the emotes, wherein the emotes are stored in computer storage associated with a social network, and wherein the emotes were posted to the social network during a second time period that is before the first time period;
retrieve the emotes from the computer storage over a computer network posted by the plurality of friends, the emotes related to a scene in the first media content and synchronized to progress points within the first media content;
while the scene is being output for display on the primary display device, output for display on a companion device an indication communicating a total count of emotes from the emotes posted by the plurality of friends and related to the scene in the first media content that express a first emotion; and
outputting for display on the companion device a feed comprising the emotes, wherein the emotes are output in synchronization with the first media content being output on the primary display device.

14. The computing system of claim 13, further configured to automatically display an emote when the first media content reaches a progress point because the emote is synchronized to the progress point.

15. The computing system of claim 13, further configured to consolidate multiple emotes synchronized to the first media content within a threshold amount of progress from each other into a summary indication.

16. The computing system of claim 13, wherein the emotes comprise five different types of emotes.

17. The computing system of claim 13, further configured to receive from the user a selection of the indication and displaying an emote details interface indicating a friend from the plurality of friends who posted an individual emote expressing the first emotion.

18. The computing system of claim 17, further configured to receive from the user a selection of the friend in the emote details interface and presenting an updated interface highlighting emotes posted by the friend and associated with the first media content.

* * * * *